(12) United States Patent
Fukasawa et al.

(10) Patent No.: US 10,447,897 B2
(45) Date of Patent: Oct. 15, 2019

(54) PROFILE ADJUSTMENT METHOD AND PROFILE ADJUSTMENT SYSTEM

(71) Applicant: SEIKO EPSON CORPORATION, Tokyo (JP)

(72) Inventors: Kenji Fukasawa, Nagano (JP); Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/996,607

(22) Filed: Jun. 4, 2018

(65) Prior Publication Data

US 2018/0352117 A1 Dec. 6, 2018

(30) Foreign Application Priority Data

Jun. 6, 2017 (JP) .................. 2017-111412

(51) Int. Cl.
*H04N 1/64* (2006.01)
*H04N 1/60* (2006.01)

(52) U.S. Cl.
CPC ............. *H04N 1/644* (2013.01); *H04N 1/603* (2013.01); *H04N 1/6052* (2013.01); *H04N 1/6022* (2013.01); *H04N 1/6036* (2013.01)

(58) Field of Classification Search
CPC ...................................................... H04N 1/644
See application file for complete search history.

(56) References Cited

U.S. PATENT DOCUMENTS

| | | | |
|---|---|---|---|
| 2003/0053097 A1* | 3/2003 | Ohga | H04N 1/6011 358/1.9 |
| 2008/0079966 A1* | 4/2008 | Thomas | H04N 1/603 358/1.9 |
| 2008/0158579 A1 | 7/2008 | Ohga et al. | |
| 2010/0328688 A1* | 12/2010 | Sakamoto | H04N 1/6052 358/1.9 |
| 2010/0328691 A1 | 12/2010 | Hoshino et al. | |
| 2013/0207996 A1* | 8/2013 | Shibuya | G06F 3/1454 345/604 |
| 2015/0098099 A1 | 4/2015 | Matsumoto | |

FOREIGN PATENT DOCUMENTS

| | | |
|---|---|---|
| EP | 1294177 A2 | 3/2003 |
| JP | 2003-046796 A | 2/2003 |
| JP | 3796422 B2 | 7/2006 |
| JP | 4826659 B2 | 11/2011 |
| JP | 2017-111410 A | 6/2017 |

OTHER PUBLICATIONS

The Extended European Search Report for the corresponding European Patent Application No. 18176157.8 dated Nov. 6, 2018.

* cited by examiner

*Primary Examiner* — King Y Poon
*Assistant Examiner* — Michael Burleson

(57) ABSTRACT

A profile adjustment method includes: accepting first input profile as a first component, accepting at least one of a second input profile and a spot color as a second component combined with the output profile, accepting a first target of adjustment values when color conversion is executed according to the first component and the output profile, accepting a second target of adjustment values when color conversion is executed according to the second component and the output profile, and adjusting the output profile based on the first and second targets. A first output profile may be accepted as the first component combined with the input profile and a second output profile may be accepted as the second component combined with the input profile.

14 Claims, 23 Drawing Sheets

FIG. 4

COMBINATION TARGET: Input_1.icc ← 611   ST5

| ID | C | M | Y | K | L | a | b | T_C | T_M | T_Y | T_K | Radius |
|----|------|------|-------|-------|-------|--------|--------|-------|-------|--------|--------|--------|
| 1 | 10.00 | 20.00 | 0.00 | 0.00 | 83.20 | 14.90 | -13.40 | 11.60 | 18.00 | 0.50 | 0.00 | 20.00 |
| 2 | 40.00 | 0.00 | 20.00 | 0.00 | 74.50 | -24.40 | -18.80 | 39.00 | 0.00 | 19.00 | 0.00 | 20.00 |
| 3 | 0.00 | 20.00 | 100.00 | 20.00 | 76.80 | 5.90 | 71.10 | 2.00 | 20.00 | 100.00 | 20.00 | 20.00 |
| 4 | 0.00 | 0.00 | 0.00 | 100.00 | 23.80 | 2.50 | -0.90 | 2.00 | 0.00 | 0.00 | 100.00 | 20.00 |

P0 — T1, T0 — ST3

COMBINATION TARGET: Input_2.icc ← 612   ST5

| ID | R | G | B | L | a | b | T_c | T_m | T_y | T_k | Radius |
|----|-------|--------|-------|-------|--------|--------|-----|-----|-----|-----|--------|
| 1 | 10.00 | 100.00 | 1.00 | 87.90 | -78.30 | 81.50 | | | | | 50.00 |
| 2 | 0.00 | 24.00 | 39.00 | 23.70 | -4.60 | -28.90 | | | | | 50.00 |
| 3 | 50.00 | 50.00 | 50.00 | 53.60 | 0.00 | 0.00 | | | | | 50.00 |

P0 — T2, T0 — ST4

COMBINATION TARGET: NamedColor_1.icc ← 645   ST5

| ID | L | a | b | L | a | b | T_L | T_a | T_b | Radius |
|----|-------|-------|-------|-------|-------|-------|-----|-----|-----|--------|
| 1 | 67.00 | 72.00 | 43.00 | 67.00 | 72.00 | 43.00 | | | | 20.00 |

COMBINATION TARGET: Output_1.icc ← 621                                    ST5

| ID | L | a | b | c | m | y | k | T_C | T_M | T_Y | T_K | Radius |
|----|-----|-------|--------|-------|-------|-------|--------|-------|--------|--------|--------|--------|
| 1  | 83.20 | 14.90 | -13.40 | 11.00 | 18.00 | 1.00  | 0.00   | 11.60 | 18.00  | 0.50   | 0.00   | 20.00  |
| 2  | 74.50 | -24.40| -18.80 | 37.00 | 1.50  | 21.50 | 0.00   | 39.00 | 0.00   | 19.00  | 0.00   | 20.00  |
| 3  | 76.80 | 5.90  | 71.10  | 2.00  | 22.00 | 96.00 | 20.00  | 2.00  | 20.00  | 100.00 | 20.00  | 20.00  |
| 4  | 23.80 | 2.50  | -0.90  | 0.00  | 0.00  | 0.00  | 100.00 | 2.00  | 0.00   | 0.00   | 100.00 | 20.00  |

T1, T0 — ST3

COMBINATION TARGET: Output_2.icc ← 622                                    ST5

| ID | L | a | b | c | m | y | k | T_c | T_m | T_y | T_k | Radius |
|----|-----|-------|--------|-------|-------|-------|--------|-------|--------|--------|--------|--------|
| 1  | 83.20 | 14.90 | -13.40 | 11.00 | 18.00 | 1.00  | 0.00   | 9.00  | 15.00  | 2.00   | 0.00   | 20.00  |
| 2  | 74.50 | -24.40| -18.80 | 37.00 | 1.50  | 21.50 | 0.00   | 38.00 | 1.00   | 16.00  | 0.00   | 20.00  |
| 3  | 76.80 | 5.90  | 71.10  | 2.00  | 22.00 | 96.00 | 20.00  | 0.00  | 20.50  | 96.00  | 20.00  | 20.00  |
| 4  | 23.80 | 2.50  | -0.90  | 0.00  | 0.00  | 0.00  | 100.00 | 2.00  | 0.00   | 0.00   | 100.00 | 20.00  |

T2, T0 — ST4

RANGE A4: $D = \dfrac{a2 \times D2 + a3 \times D3}{a2 + a3}$

RANGE A5: $D = \dfrac{a1 \times D1 + a3 \times D3}{a1 + a3}$

RANGE A6: $D = \dfrac{a1 \times D1 + a2 \times D2}{a1 + a2}$

RANGE A7: $D = \dfrac{a1 \times D1 + a2 \times D2 + a3 \times D3}{a1 + a2 + a3}$

FIG. 17A

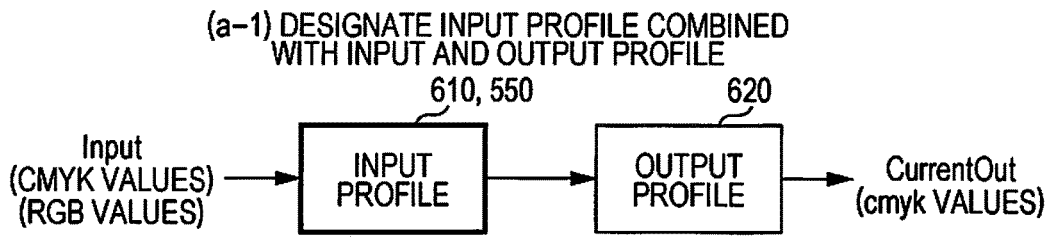

(a-1) DESIGNATE INPUT PROFILE COMBINED WITH INPUT AND OUTPUT PROFILE

FIG. 17B

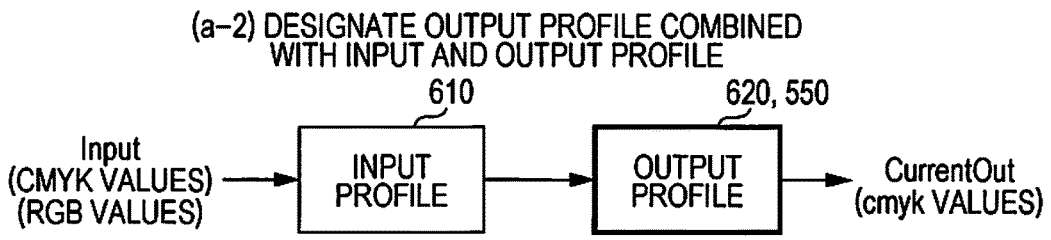

(a-2) DESIGNATE OUTPUT PROFILE COMBINED WITH INPUT AND OUTPUT PROFILE

FIG. 17C

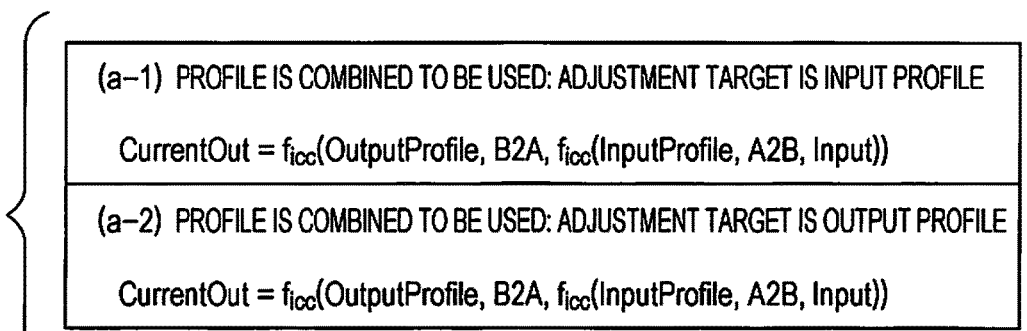

(a-1) PROFILE IS COMBINED TO BE USED: ADJUSTMENT TARGET IS INPUT PROFILE

CurrentOut = $f_{icc}$(OutputProfile, B2A, $f_{icc}$(InputProfile, A2B, Input))

(a-2) PROFILE IS COMBINED TO BE USED: ADJUSTMENT TARGET IS OUTPUT PROFILE

CurrentOut = $f_{icc}$(OutputProfile, B2A, $f_{icc}$(InputProfile, A2B, Input))

HEREIN,
InputProfile IS INPUT PROFILE,
OutputProfile IS OUTPUT PROFILE,
$f_{icc}$ INDICATES COLOR CONVERSION BY ICC PROFILE,
FIRST ARGUMENT IS PROFILE NAME,
A2B OF SECOND ARGUMENT INDICATES CONVERSION FROM DEVICE COLOR TO DEVICE-INDEPENDENT COLOR,
B2A OF SECOND ARGUMENT INDICATES CONVERSION FROM DEVICE-INDEPENDENT COLOR TO DEVICE COLOR,
THIRD ARGUMENT IS INPUT VALUES OF ADJUSTMENT POINTS (CMYK, RGB, Lab, OR THE LIKE).

FIG. 19

(a-1) PROFILE IS COMBINED TO BE USED: ADJUSTMENT TARGET IS INPUT PROFILE (a-1-1) SELECT INPUT COLOR SPACE IN ADJUSTMENT TARGET COLOR SPACE
TargetOut
= $f_{icc}$(OutputProfile, B2A, $f_{icc}$(InputProfile, A2B, Input + AdjustData))
(a-1-2) SELECT OUTPUT COLOR SPACE IN ADJUSTMENT TARGET COLOR SPACE
TargetOut
= $f_{icc}$(OutputProfile, B2A, $f_{icc}$(InputProfile, A2B, Input)) + AdjustData
(a-1-3) SELECT PCS IN ADJUSTMENT TARGET COLOR SPACE
TargetOut
= $f_{icc}$(OutputProfile, B2A, $f_{icc}$(InputProfile, A2B, Input) + AdjustData)

(a-2) PROFILE IS COMBINED TO BE USED: ADJUSTMENT TARGET IS OUTPUT PROFILE (SAME AS (a-1) CASE)

FIG. 20A (a-1) DESIGNATE INPUT PROFILE COMBINED WITH INPUT AND OUTPUT PROFILE

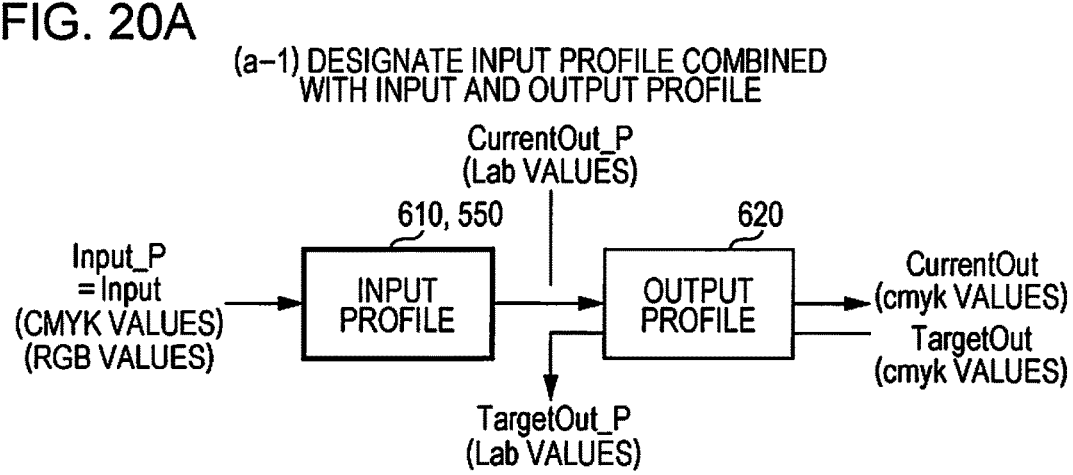

FIG. 20B (a-2) DESIGNATE OUTPUT PROFILE COMBINED WITH INPUT AND OUTPUT PROFILE

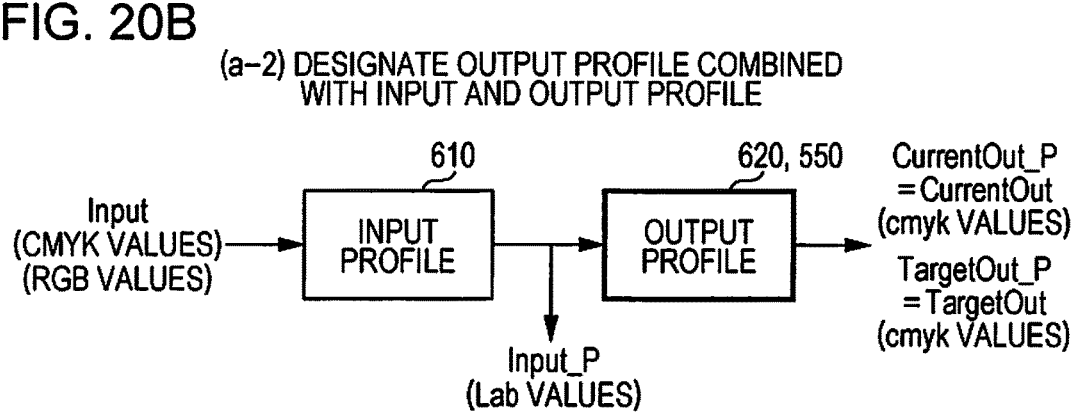

FIG. 20C (a-1) PROFILE IS COMBINED TO BE USED: ADJUSTMENT TARGET IS INPUT PROFILE

Input_P = Input
TargetOut_P = $f_{icc}$(OutputProfile, A2B, TargetOut)

(a-2) PROFILE IS COMBINED TO BE USED: ADJUSTMENT TARGET IS OUTPUT PROFILE

Input_P = $f_{icc}$(InputProfile, A2B, Input)
TargetOut_P = TargetOut

FIG. 21A

SET1

COMBINATION TARGET: Input_1.icc  ← 611

| ID | L | a | b | Δc | Δm | Δy | Δk |
|---|---|---|---|---|---|---|---|
| 1 | 83.20 | 14.90 | -13.40 | 1.50 | -2.00 | 0.50 | 0.00 |
| 2 | 74.50 | -24.40 | -18.80 | -1.00 | 0.00 | -1.00 | 0.00 |
| 3 | 76.80 | 5.90 | 71.10 | 2.10 | 0.00 | 0.00 | 0.00 |
| 4 | 23.80 | 2.50 | -0.90 | 2.00 | 0.00 | 0.00 | 0.00 |

COMBINATION TARGET: Input_2.icc  ← 612

| ID | L | a | b | Δc | Δm | Δy | Δk |
|---|---|---|---|---|---|---|---|
| 1 | 87.90 | -78.30 | 81.50 | -1.00 | -5.00 | 2.00 | 0.00 |
| 2 | 23.70 | -4.60 | -28.90 | -2.20 | 0.50 | -4.00 | 0.00 |
| 3 | 53.60 | 0.00 | 0.00 | 0.00 | 0.30 | 3.50 | 0.00 |

COMBINATION TARGET: NamedColor_1.icc  ← 645

| ID | L | a | b | Δc | Δm | Δy | Δk |
|---|---|---|---|---|---|---|---|
| 1 | 67.00 | 72.00 | 43.00 | -2.00 | 7.00 | 0.00 | 0.00 |

FIG. 21B

SET2

COMBINATION TARGET: Output_1.icc  ← 621

| ID | C | M | Y | K | ΔL | Δa | Δb |
|---|---|---|---|---|---|---|---|
| 1 | 10.00 | 20.00 | 0.00 | 0.00 | 1.50 | -2.00 | 0.50 |
| 2 | 40.00 | 0.00 | 20.00 | 0.00 | -1.00 | 0.00 | -1.00 |
| 3 | 0.00 | 20.00 | 100.00 | 20.00 | 2.10 | 0.00 | 0.00 |
| 4 | 0.00 | 0.00 | 0.00 | 100.00 | 2.00 | 0.00 | 0.00 |

COMBINATION TARGET: Output_2.icc  ← 622

| ID | C | M | Y | K | ΔL | Δa | Δb |
|---|---|---|---|---|---|---|---|
| 1 | 10.00 | 20.00 | 0.00 | 0.00 | -1.00 | -5.00 | 2.00 |
| 2 | 40.00 | 0.00 | 20.00 | 0.00 | -2.20 | 0.50 | -4.00 |
| 3 | 0.00 | 20.00 | 100.00 | 20.00 | 0.00 | 0.30 | -3.50 |
| 4 | 0.00 | 0.00 | 0.00 | 100.00 | 2.50 | 0.00 | 0.00 |

PROFILE ADJUSTMENT METHOD AND PROFILE ADJUSTMENT SYSTEM

BACKGROUND

1. Technical Field

The present invention relates to a technology for adjusting a profile used to convert coordinate values of a color space.

2. Related Art

When an ink jet printer is used to calibrate printing such as offset printing, color reproduction precision to be requested (the degree of accurately color reproduction) is very high. As a mechanism for realizing the color reproduction precision, there is a color management system that uses an international color consortium (ICC) profile. The ICC profile is data indicating a correspondent relation between device-independent color and a device-dependent color of a color device such as a printer (for example, an offset printer) or an ink jet printer. The device-dependent color of a printer or an ink jet printer is expressed by, for example, CMYK values indicating use amounts of cyan (C), magenta (M), yellow (Y), and black (K). The device-dependent color is expressed by, for example, saturation values of a CIE (international commission on illumination) L*a*b* color space ("*" is omitted and Lab values are used) or saturation values of a CIE XYZ color space which is a device-independent color space.

Here, an ICC profile of a printer is referred to as an input profile and an ICC profile of an ink jet printer is referred to as an output profile. When CMYK values (referred to as $CMYK_t$ values) in a printer are converted into saturation values (for example, Lab values) of a profile connection space (PCS) according to an input profile, the saturation values can be converted into CMYK values (referred to as $CMYK_p$ values) of the ink jet printer according to an output profile. When printing is executed by an ink jet printer according to the $CMYK_p$ values, colors closes to colors of a printer can be reproduced with the ink jet printer. Actually, expected colors may not be reproduced due to an error of a profile, a color measurement error, a variation in a printer, or the like in some cases. In these cases, conversion precision of target colors is improved by correcting the ICC profile.

JP-A-2003-87589 discloses a method of adjusting input values (Lab values) of an output profile for a CMYK printer to adjust color reproduction of the CMYK printer using a calibrator as a target device. An input profile combined with the output profile is only one kind of input profile for a calibrator.

For example, when printing or the like is executed, one output profile for a printer is combined not only with an input profile for CMYK data for a printer but also with an input profile for RGB data for a display device or spot color for designating direct color with Lab values in some cases. In this case, when only a combination of the input profile for a printer and an output profile for a printer are optimized, a sufficient improvement in color reproduction precision may not be expected in a combination of another input profile (for example, an input profile for a display device) or a spot color and an output profile for a printer. To obtain sufficient color reproduction precision even in a combination of the other input profile or the spot color and the output profile for a printer, it is necessary to switch a target with which the output profile for a printer is combined.

Another output profile is combined with one input profile according to a kind of print substrate. In this case, when a combination of the input profile and the output profile for a certain kind of print substrate is optimized, a sufficient improvement in the color reproduction precision may not be expected in a combination of another kind of print substrate and the output profile.

The above-described problem is not limited to an adjustment case of a profile targeting an inkjet printer and may also arise even when a profile targeting various color devices is adjusted.

SUMMARY

An advantage of some aspects of the invention is that it provides a technology for improving convenience of work for adjusting a profile when a plurality of kinds of color conversion are executed.

According to an aspect of the invention, there is provided a profile adjustment method of adjusting a profile to be used to convert first coordinate values of a first color space into second coordinate values of a second color space. The profile adjustment method includes: accepting a first input profile defining a correspondent relation between the first coordinate values and third coordinate values of a profile connection space, as a first component combined with an output profile defining a correspondent relation between the third coordinate values and the second coordinate values; accepting at least one of a second input profile defining a correspondent relation between the first coordinate values and the third coordinate values, and a spot color expressed with the third coordinate values, as a second component combined with the output profile; accepting a first target of adjustment values at coordinates indicating an adjustment target color when the first coordinate values are converted into the second coordinate values according to the first component and the output profile; accepting a second target of adjustment values at coordinates indicating an adjustment target color when at least one of the first coordinate values and the third coordinate values is converted into the second coordinate values according to the second component and the output profile; and adjusting the output profile based on the accepted first and second targets.

According to another aspect of the invention, there is provided a profile adjustment method of adjusting a profile to be used to convert first coordinate values of a first color space into second coordinate values of a second color space. The profile adjustment method includes: accepting a first output profile defining a correspondent relation between third coordinate values of a profile connection space and the second coordinate values, as a first component combined with an input profile defining a correspondent relation between the first coordinate values and the third coordinate values; accepting a second output profile defining a correspondent relation between the third coordinate values and the second coordinate values, as a second component combining with the input profile; accepting a first target of adjustment values at coordinates indicating an adjustment target color when the first coordinate values are converted into the second coordinate values according to the input profile and the first component; accepting a second target of adjustment values at coordinates indicating an adjustment target color when the first coordinate values are converted into the second coordinate values according to the input profile and the second component; and adjusting the input profile based on the accepted first and second targets.

According to still another aspect of the invention, there is provided a profile adjustment program causing a computer to realize functions corresponding to the steps of the above-described profile adjustment method.

According to still another aspect of the invention, there is provided a profile adjustment system including units corresponding to the steps of the above-described profile adjustment method.

In this case, it is possible to provide a technology for improving convenience of work for adjusting a profile when a plurality of kinds of color conversion are executed.

BRIEF DESCRIPTION OF THE DRAWINGS

The invention will be described with reference to the accompanying drawings, wherein like numbers reference like elements.

FIG. 4 is a diagram schematically illustrating examples of relations of various profiles.

FIG. 12 is a diagram schematically illustrating an example of a target acceptance region when an output profile is set as an adjustment target.

FIG. 13 is a diagram schematically illustrating an example of a target acceptance region when an input profile is set as an adjustment target.

FIGS. 17A and 17B are diagrams schematically illustrating calculation examples of current output values and FIG. 17C is a diagram schematically illustrating an expression for calculating current output values.

FIG. 19 is a diagram schematically illustrating an example of an expression for calculating target output values.

FIGS. 20A and 20B are diagrams schematically illustrating an example in which input values and adjustment target values of an adjustment target profile are obtained and FIG. 20C is a diagram schematically illustrating an example of an expression for calculating input values and adjustment target values of an adjustment target profile.

FIG. 21A is a diagram schematically illustrating an example of a data set for adjusting an output profile and FIG. 21B is a diagram schematically illustrating an example of a data set for adjusting an input profile.

DESCRIPTION OF EXEMPLARY EMBODIMENTS

Figure 1:
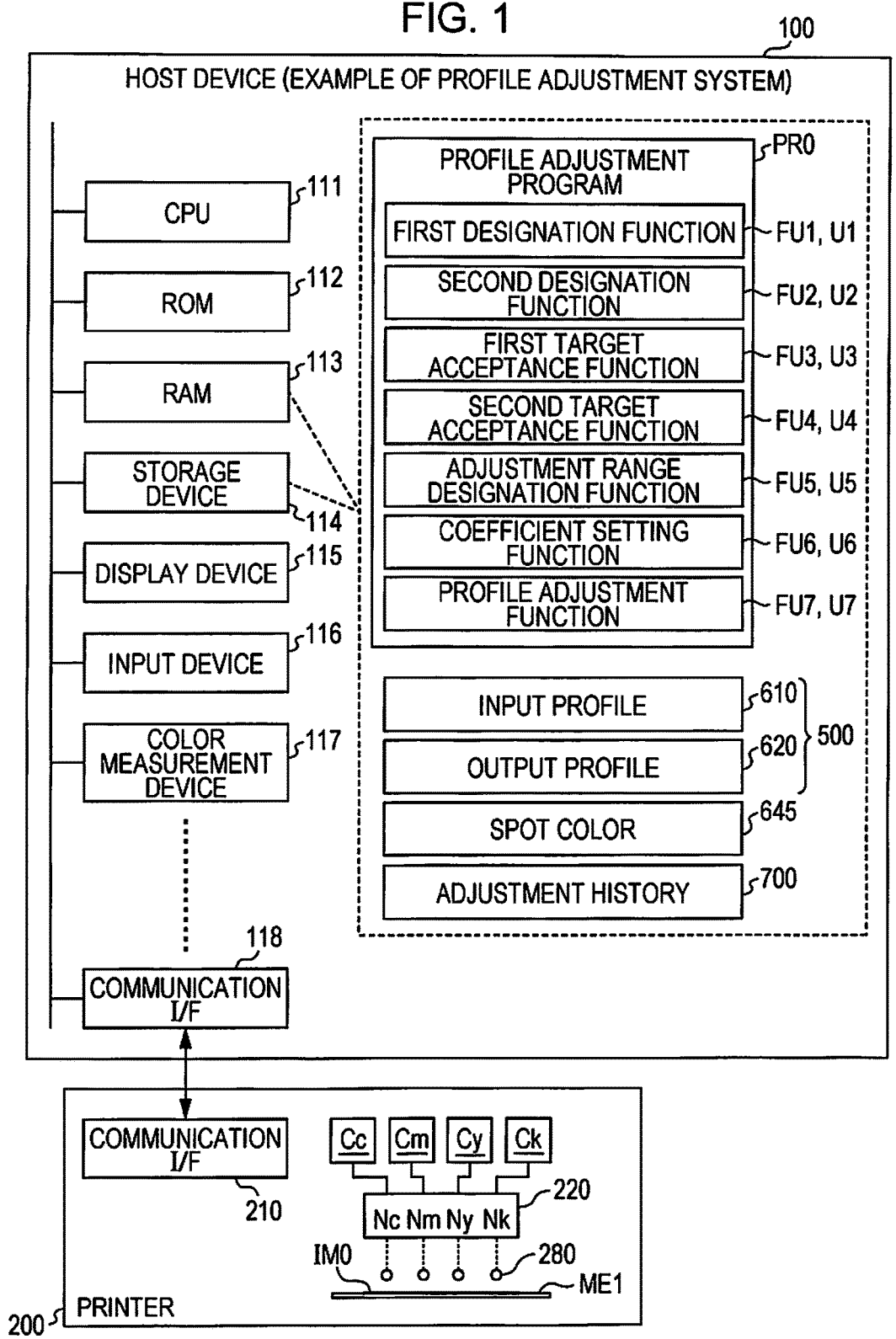
FIG. 1 is a block diagram schematically illustrating a configuration example of a profile adjustment system.

Hereinafter, embodiments will be described. Of course, the following embodiments are merely examples of the invention and all the characteristics described in the embodiments are not necessarily resolutions of the invention.

(1) Overview of Technology Included in Invention

First, an overview of a technology included in the invention will be described with reference to examples illustrated in FIGS. 1 to 23B. The drawings in the present specification are drawings schematically illustrating the examples and magnifications in each direction illustrated in the drawings are different in some cases, and thus each drawing is not consistent in some cases. Of course, elements of the present technology are not limited to specific examples denoted by reference numerals.

Aspect 1

According to an aspect of the technology, a profile adjustment method is a profile adjustment method of adjusting a profile 500 to be used to convert first coordinate values (for example, CMYK values or RGB values) of a first color space CS1 (for example, a CMYK color space or an RGB color space) into second coordinate values (for example, cmyk values) of a second color space CS2 (for example, a cmyk color space). The profile adjustment method includes a first designation step ST1, a second designation step ST2, a first target acceptance step ST3, a second target acceptance step ST4, and a profile adjustment step ST7. In the first designation step ST1, a first input profile 611 defining a correspondent relation between the first coordinate values and third coordinate values (for example, Lab values) of a profile connection space CS3 (for example, an Lab color space) is accepted as a first component combined with an output profile 620 defining a correspondent relation between the third coordinate values and the second coordinate values. In the second designation step ST2, at least one of a second input profile 612 defining a correspondent relation between the first coordinate values and the third coordinate values and a spot color 645 expressed with the third coordinate values is accepted as a second component combined with the output profile 620. In the first target acceptance step ST3, a first target T1 of adjustment values at coordinates indicating an adjustment target color (for example, an adjustment point P0) is accepted when the first coordinate values are converted into the second coordinate values according to the first component (611) and the output profile 620. In the second target acceptance step ST4, a second target T2 of adjustment values at coordinates indicating an adjustment target color (P0) is accepted when at least one of the first coordinate values and the third coordinate values is converted into the second coordinate values according to the second component (612 or 645) and the output profile 620. In the profile adjustment step ST7, the output profile 620 is adjusted based on the accepted first target T1 and second target T2.

In the foregoing Aspect 1, the output profile 620 is adjusted in the first color conversion according to the first input profile 611 and the output profile 620. The output profile 620 is adjusted even in the second color conversion according to the second input profile 612 or the spot color 645 and the output profile 620. Therefore, it is not necessary to switch a combination target to adjustment the output profile 620. Accordingly, it is possible to provide the profile adjustment method capable of improving convenience of work for adjusting the output profile when a plurality of kinds of color conversion including the first color conversion and the second color conversion are executed.

Here, the profile connection space includes a color space such as a CIE Lab color space and a CIE XYZ color space.

Here, the first color space includes a CMYK color space, a CMY color space, and an RGB color space. R stands for red, G stands for green, and B stands for blue.

The second color space includes a CMYK color space, a CMY color space, and an RGB color space. In the following embodiment, the second color space is notated as the cmyk color space to distinguish the second color space from the CMYK color space which is the first color space when the second color space is the CMYK color space.

The coordinates indicating the adjustment target color may be expressed with the first coordinate values of the first color space, may be expressed with the second coordinate values of the second color space, or may be expressed with the third coordinate values of the profile connection space.

The adjustment target at the coordinates indicating the adjustment target color may be expressed with coordinate values of the color space or may be expressed with differences from current coordinate values of the color space.

The second component combined with the output profile may be two or more components, may be two or more second input profiles, may be two or more spot colors, or may be both of the second input profile and the spot color.

The additional remarks of the foregoing Aspect 1 are the same in the following aspects.

Aspect 2

According to another aspect of the technology, a profile adjustment method is a profile adjustment method of adjusting the profile 500 to be used to convert the first coordinate values (for example, the CMYK values or the RGB values) of the first color space CS1 (for example, the CMYK color space or the RGB color space) into the second coordinate values (for example, the cmyk values) of the second color space CS2 (for example, the cmyk color space). The profile adjustment method includes the first designation step ST1, the second designation step ST2, the first target acceptance step ST3, the second target acceptance step ST4, and the profile adjustment step ST7. In the first designation step ST1, a first output profile 621 defining a correspondent relation between the third coordinate values of the profile connection space CS3 and the second coordinate values is accepted as the first component combined with the input profile 610 defining a correspondent relation between the first coordinate values and the third coordinate values. In the second designation step ST2, a second output profile 622 defining a correspondent relation between the third coordinate values and the second coordinate values is accepted as a second component combining with the input profile 610. In the first target acceptance step ST3, the first target T1 of the adjustment values at coordinates indicating an adjustment target color (for example, the adjustment point P0) is accepted when the first coordinate values are converted into the second coordinate values according to the input profile 610 and the first component (621). In the second target acceptance step ST4, the second target T2 of adjustment values at coordinates indicating an adjustment target color (P0) is accepted when the first coordinate values are converted into the second coordinate values according to the input profile 610 and the second component (622). In the profile adjustment step ST7, the input profile 610 is adjusted based on the accepted first target T1 and second target T2.

In the foregoing Aspect 2, the input profile 610 is adjusted in the first color conversion according to the input profile 610 and the first output profile 621. The input profile 610 is adjusted even in the second color conversion according to the input profile 610 and the second output profile 622. Therefore, it is not necessary to switch a combination target to adjust the input profile 610. Accordingly, it is possible to provide the profile adjustment method capable of improving convenience of work for adjusting the input profile when a plurality of kinds of color conversion including the first color conversion and the second color conversion are executed.

Here, the second component combined with the input profile may be two or more second output profiles. This additional remark is the same in the following aspects.

Aspect 3

Figure 8:
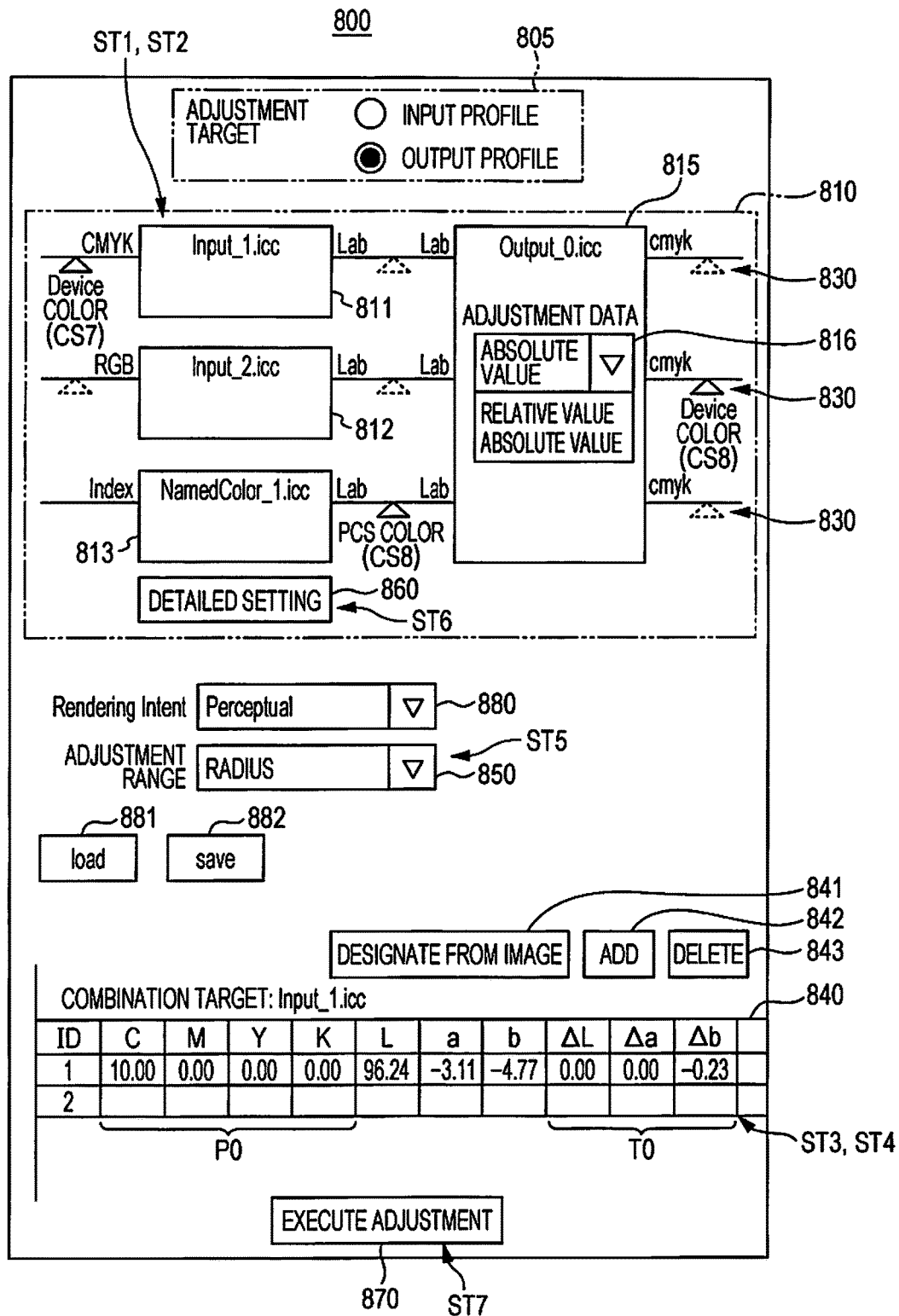
FIG. 8 is a diagram schematically illustrating an example of a user interface screen.
Figure 9:
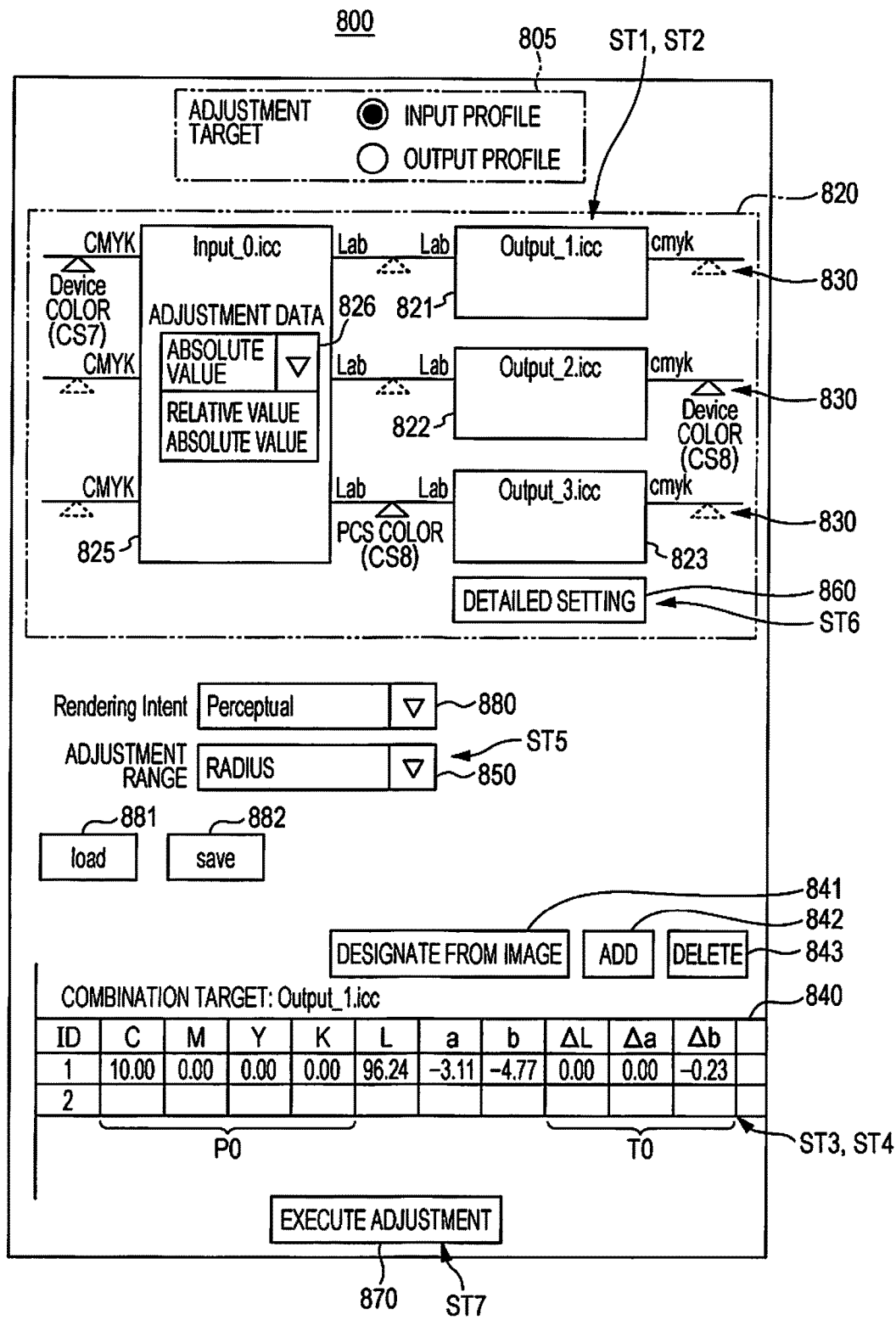
FIG. 9 is a diagram schematically illustrating an example of the user interface screen.

As exemplified in FIGS. 8 and 9, in the first target acceptance step ST3, one of two or more kinds of color spaces among the first color space CS1, the second color space CS2, and the profile connection space CS3 may be accepted as a first adjustment target color space CS7. In the first target acceptance step ST3, the first target T1 of the adjustment values at the coordinates indicating the adjustment target color (P0) in the first adjustment target color space CS7 may be accepted. In this aspect, the coordinate values at which the first target T1 is accepted can be selected from two or more kinds of the first coordinate values of the first color space CS1, the second coordinate values of the second color space CS2, and the third coordinate values of the profile connection space CS3. Accordingly, this aspect can provide a technology for further improving convenience of the work for adjusting the profile.

The technology include a case in which the first adjustment target color space is determined in advance although not included in the foregoing Aspect 3.

Aspect 4

As exemplified in FIGS. 8 and 9, in the second target acceptance step ST4, one of two or more kinds of color spaces among the first color space CS1, the second color space CS2, and the profile connection space CS3 may be accepted as a second adjustment target color space CS8. In the second target acceptance step ST4, the second target T2 of the adjustment values at the coordinates indicating the adjustment target color (P0) in the second adjustment target color space CS8 may be accepted. In this aspect, the coordinate values at which the second target T2 is accepted can be selected from two or more kinds of the first coordinate values of the first color space CS1, the second coordinate values of the second color space CS2, and the third coordinate values of the profile connection space CS3. Accordingly, this aspect can provide a technology for further improving convenience of the work for adjusting the profile.

The technology include a case in which the second adjustment target color space is determined in advance although not included in the foregoing Aspect 4.

Aspect 5

As exemplified in FIGS. 12, 13, and the like, the profile adjustment method may further include an adjustment range designation step ST5 of accepting an adjustment range A0 adjusted based on the first target T1 and the second target T2 in an adjustment target profile 550 (the output profile 620 or the input profile 610) which is an adjustment target in the profile adjustment step ST7. In the profile adjustment step ST7, the adjustment range A0 of the adjustment target profile 550 may be adjusted based on the first target T1 and the second target T2. This aspect can provide the technology for further improving convenience of the work for adjusting the profile since the adjustment range A0 adjusted based on the first target T1 and the second target T2 in the adjustment target profile 550 can be designated.

Here, the adjustment range is not limited to a part of the color space, but may be the whole color space. This additional remark is the same in the following aspects.

The technology includes a case in which the adjustment range is fixed although not included in the foregoing Aspect 5.

Aspect 6

Figure 10:
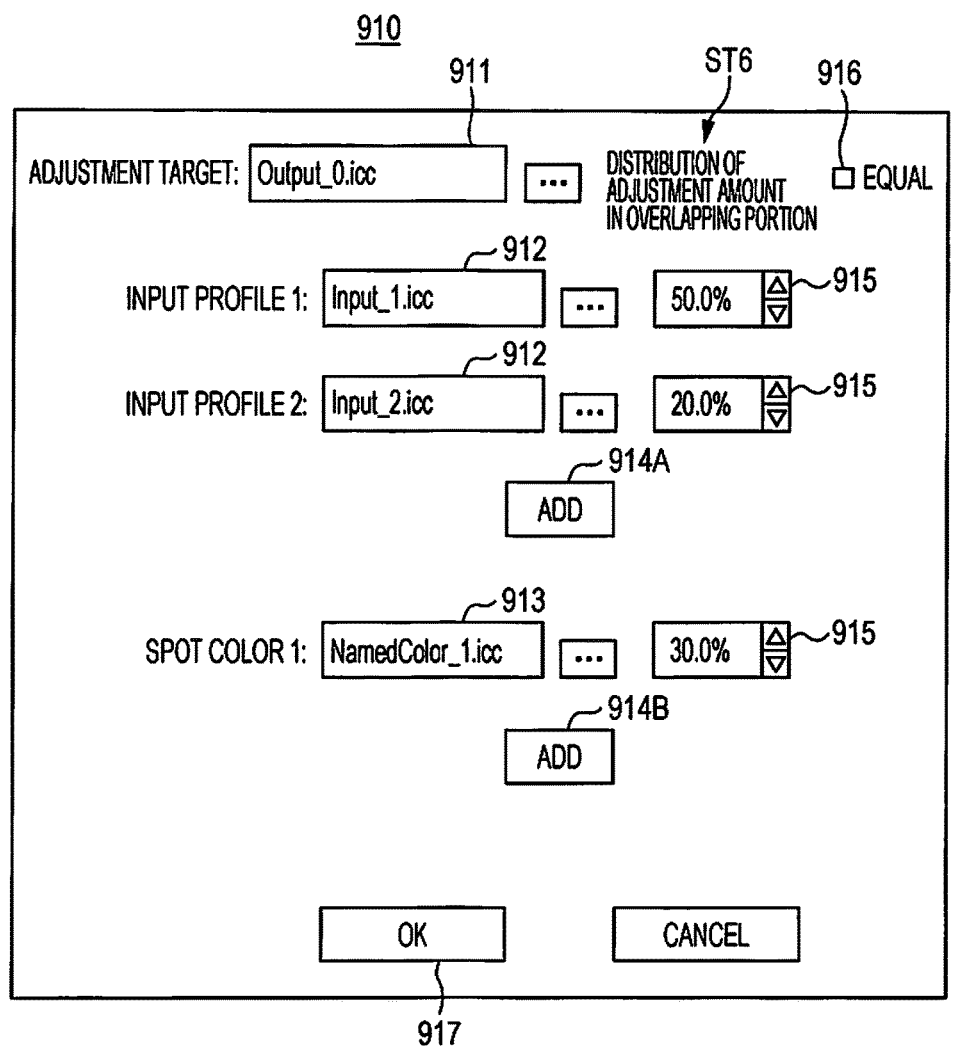
FIG. 10 is a diagram schematically illustrating an example of a detailed setting screen.
Figure 11:
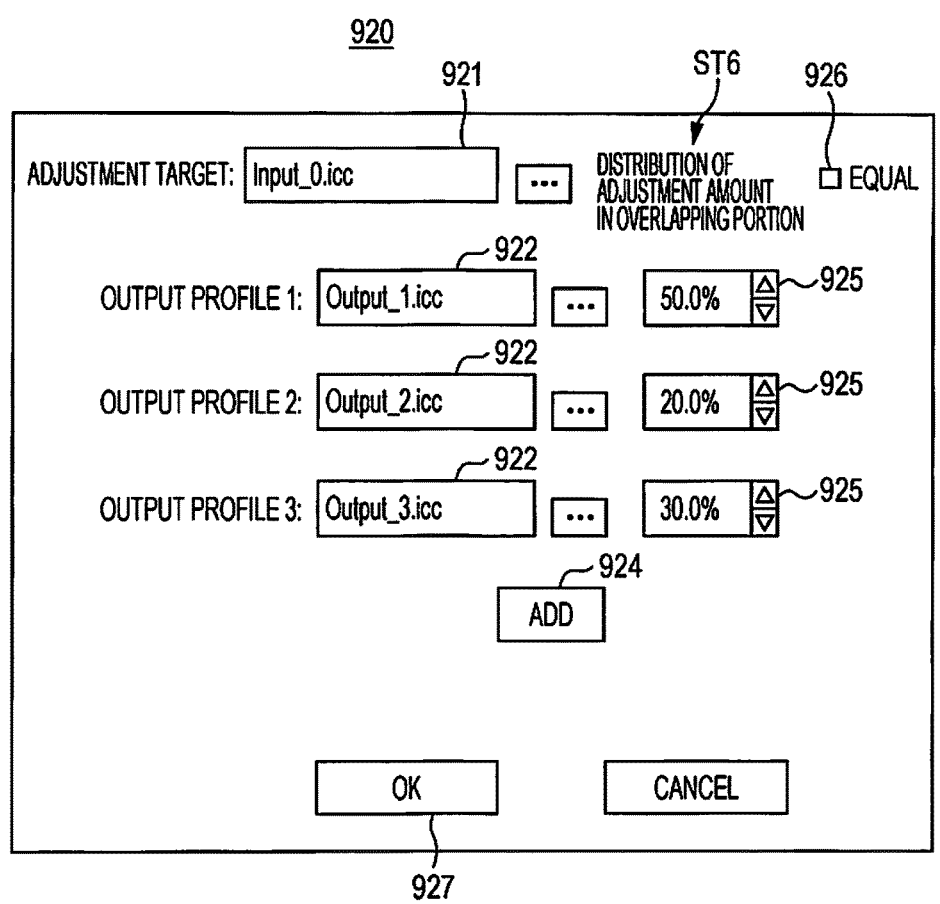
FIG. 11 is a diagram schematically illustrating an example of a detailed setting screen.
Figure 14A:
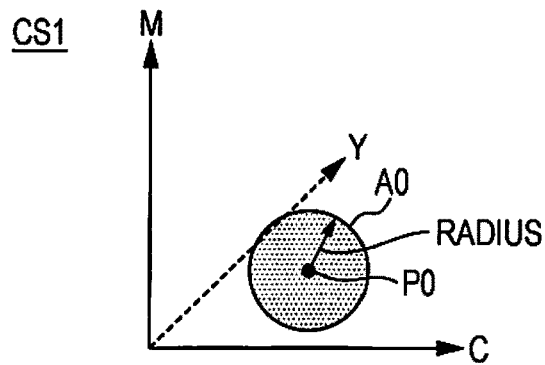
FIG. 14A is a diagram schematically illustrating an example of setting of an adjustment point and FIG. 14B is a diagram schematically illustrating an example of distribution of an adjustment amount when adjustment ranges overlap each other.
Figure 14B:
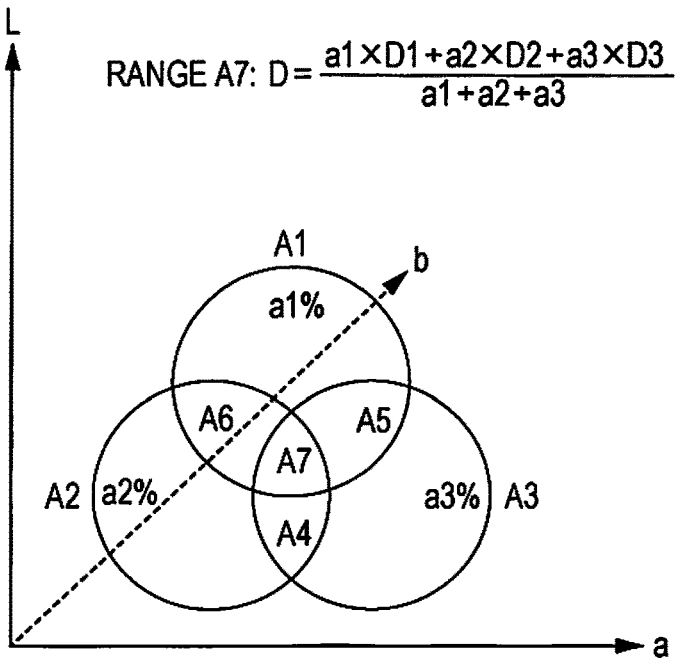

As exemplified in FIGS. 10, 11, and 14B, in the profile adjustment step ST7, when a range (A1) adjusted by the first target T1 overlaps a range (A2 or A3) adjusted by the second target T2 in the adjustment target profile 550 which is an adjustment target, the adjustment target profile 550 may be adjusted so that an adjustment amount D is obtained using a first adjustment amount (for example, an adjustment amount D1) indicating the degree of adjustment by the first target T1 and a second adjustment amount (for example, an adjustment amount D2 or D3) indicating the degree of adjustment by the second target T2 in the overlapping range (A4 to A7). Since the first adjustment amount (D1) and the second adjustment amount (D2 or D3) are reflected in the adjustment of the adjustment target profile 550 in the overlapping range (A4 to A7) of the range (A1) adjusted by the first target T1 and the range (A2 or A3) adjusted by the second target T2, this aspect can provide a preferred technology for adjusting the profile when the plurality of kinds of color conversion are executed.

Aspect 7

As exemplified in FIGS. 10, 11, and 14B, the profile adjustment method may further include a coefficient setting step ST6 of accepting setting of a coefficient (for example, a weight a1, a2, or a3) in at least one of the first adjustment amount (D1) and the second adjustment amounts (D2 and D3) for obtaining the adjustment amount D in the overlapping ranges (A4 to A7). In the profile adjustment step ST7, the adjustment target profile 550 may be adjusted so that the adjustment amount D is obtained using the first adjustment amount (D1) and the second adjustment amounts (D2 and D3) according to the coefficient (for example, the weight a1, a2, or a3) in the overlapping ranges (A4 to A7). This aspect can provide the technology for further improving convenience of the work for adjusting the profile since a user can set the degree of reflection of at least one of the first adjustment amount (D1) and the second adjustment amounts (D2 and D3) in the adjustment of the adjustment target profile 550 in the overlapping ranges (A4 to A7).

Aspect 8

Figure 6:
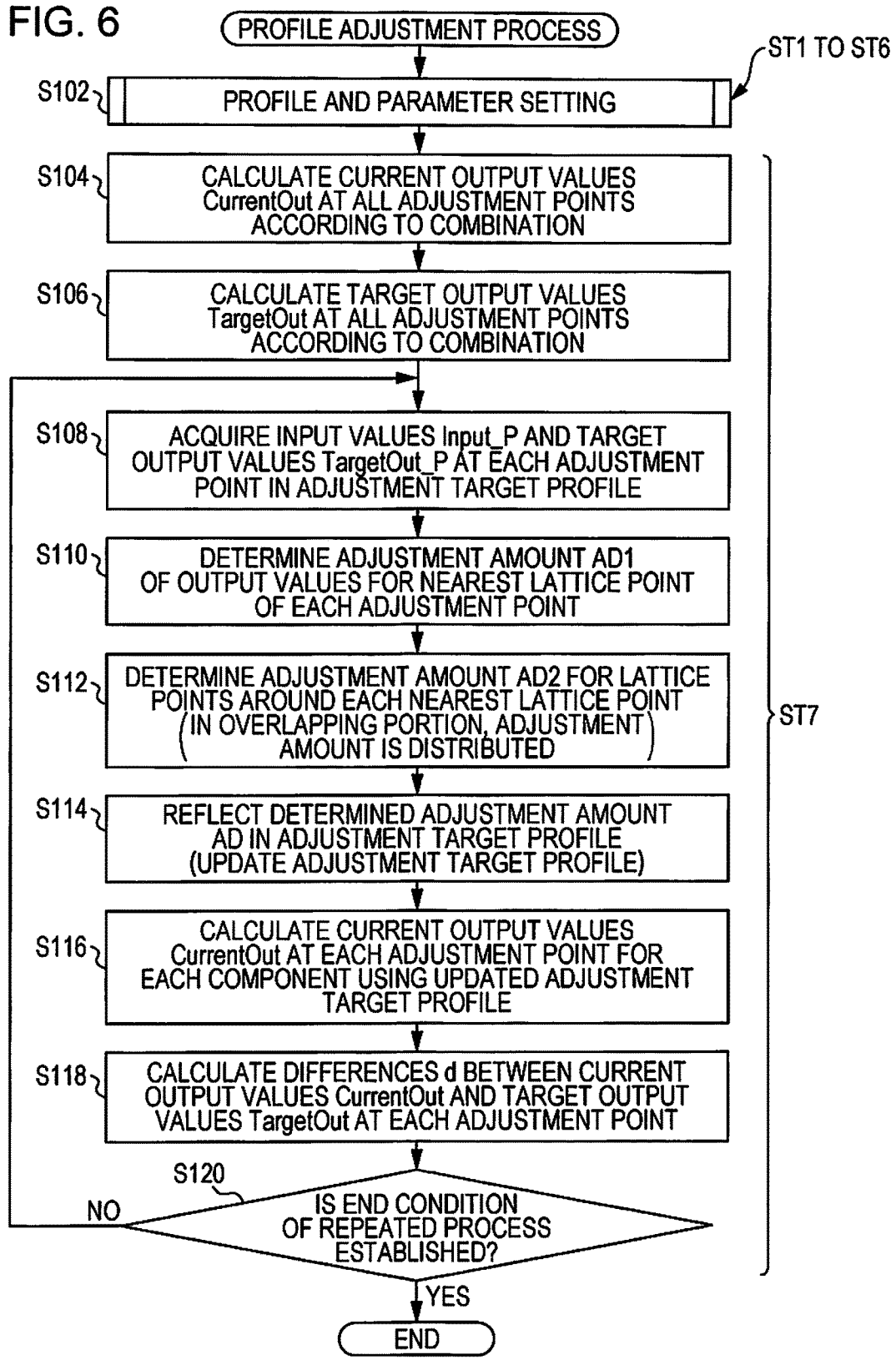
FIG. 6 is a flowchart illustrating an example of a profile adjustment process.

As exemplified in FIG. 6 and the like, in the profile adjustment step ST7, when the first target T1 and the second target T2 are not expressed with the second coordinate values, the second coordinate values corresponding to the first target T1 and the second target T2 may be obtained as target output values TargetOut and the adjustment target profile 550 may be adjusted so that the second coordinate values obtained according to the first or second component and the adjustment target profile 550 which is the adjustment target are close to the target output values TargetOut from coordinates indicating the adjustment target color (P0). This aspect can provide a technology for improving the color reproduction precision since the adjustment target profile 550 is adjusted using the second coordinate values expressing the output color as a reference.

Here, in the profile adjustment step ST7, the adjustment target profile 550 may be adjusted by repeating a calculation process of causing the obtained second coordinate values to be close to the target output values TargetOut.

The technology also includes a case in which the adjustment target profile is adjusted so that the third coordinate values of the profile connection space or the first coordinate values of the first color space are close to the target values although not included in the foregoing Aspect 8.

Aspect 9

Incidentally, according to an aspect of the technology, a profile adjustment program PR0 causes a computer to realize functions corresponding to the steps of Aspect 1, that is, the first destination function FU1 corresponding to the first designation step ST1, the second designation function FU2 corresponding to the second designation step ST2, the first target acceptance function FU3 corresponding to the first target acceptance step ST3, the second target acceptance function FU4 corresponding to the second target acceptance step ST4, and the profile adjustment function FU7 corresponding to the profile adjustment step ST7. This aspect can provide a profile adjustment program improving convenience of the work for adjusting the output profile when the plurality of kinds of color conversion are executed. The profile adjustment program PR0 may also cause a computer to realize the adjustment range designation function FU5 corresponding to the adjustment range designation step ST5 and the coefficient setting function FU6 corresponding to the coefficient setting step ST6.

Aspect 10

According to another aspect of the technology, the profile adjustment program PR0 causes a computer to realize functions corresponding to the steps of Aspect 2, that is, the first destination function FU1 corresponding to the first designation step ST1, the second designation function FU2 corresponding to the second designation step ST2, the first target acceptance function FU3 corresponding to the first target acceptance step ST3, the second target acceptance function FU4 corresponding to the second target acceptance step ST4, and the profile adjustment function FU7 corresponding to the profile adjustment step ST7. This aspect can provide a profile adjustment program improving convenience of the work for adjusting the input profile when the plurality of kinds of color conversion are executed. The profile adjustment program PR0 may also cause a computer to realize the adjustment range designation function FU5 corresponding to the adjustment range designation step ST5 and the coefficient setting function FU6 corresponding to the coefficient setting step ST6.

Aspect 11

Further, according to an aspect of the technology, a profile adjustment system (for example, a host device 100) includes units corresponding to the steps of Aspect 1, that is, the first designation unit U1 corresponding to the first designation step ST11, the second designation unit U2 corresponding to the second designation step ST2, the first target acceptance unit U3 corresponding to the first target acceptance step ST3, the second target acceptance unit U4 corresponding to the second target acceptance step ST4, and the profile adjustment unit U7 corresponding to the profile adjustment step ST7. This aspect can provide a profile adjustment program improving convenience of the work for adjusting the output profile when the plurality of kinds of color conversion are executed. The profile adjustment system may also cause a computer to realize the adjustment range designation unit U5 corresponding to the adjustment range designation step ST5 and the coefficient setting unit U6 corresponding to the coefficient setting step ST6.

Aspect 12

Further, according to another aspect of the technology, a profile adjustment system (for example, a host device 100) includes units corresponding to the steps of Aspect 2, that is, the first designation unit U1 corresponding to the first designation step ST1, the second designation unit U2 corresponding to the second designation step ST2, the first target acceptance unit U3 corresponding to the first target acceptance step ST3, the second target acceptance unit U4 corresponding to the second target acceptance step ST4, and the profile adjustment unit U7 corresponding to the profile adjustment step ST7. This aspect can provide a profile adjustment program improving convenience of the work for adjusting the input profile when the plurality of kinds of color conversion are executed. The profile adjustment system may also include the adjustment range designation unit U5 corresponding to the adjustment range designation step ST5 and the coefficient setting unit U6 corresponding to the coefficient setting step ST6.

Further, the technology can be applied to a method of controlling the profile adjustment system, a complex system including the profile adjustment system, a method of controlling the complex system, a program controlling the profile adjustment system, a program controlling the complex system, a profile adjustment program, and a computer-readable medium recording the control program. The above-described device may be configured with a plurality of distributed portions.

(2) Specific Example of Profile Adjustment System

FIG. 1 schematically illustrates the host device 100 as a configuration example of the profile adjustment system. In the host device 100, a central processing unit (CPU) 111, a read-only memory (ROM) 112, a random access memory (RAM) 113, a storage device 114, a display device 115, an input device 116, a color measurement device 117, a communication interface (I/F) 118, and the like are connected to each other so information can be mutually input and output.

The storage device 114 stores an operating system (OS) (not illustrated), a profile adjustment program PR0, and the like. The operating system, the profile adjustment program PR0, and the like are appropriately read to the RAM 113 to be used for adjustment process for a profile 500. Here, the profile 500 is a generic term of an input profile 610 and an output profile 620. At least one of the RAM 113 and the storage device 114 stores various kinds of information, for example, the input profile 610, the output profile 620, the spot color 645, and adjustment history 700. A nonvolatile semiconductor memory such as a flash memory or a magnetic storage device such as a hard disk can be used as the storage device 114.

A liquid crystal panel or the like can be used as the display device 115. A pointing device, a hard key including a keyboard, a touch panel attached on the surface of a display panel, or the like can be used as the input device 116. The color measurement device 117 can measure each color patch formed on a print substrate which is an example of a medium on which a color chart is formed and can output the color measurement values. The patch is also called a color chart. Color measurement values are considered as, for example, values indicating lightness L and chromaticity coordinates a and b in a CIE Lab color space. The color measurement device 117 may be installed out of the host device 100. The host device 100 acquires color measurement data including a plurality of color measurement values from the color measurement device 117 and executes various processes.

The communication I/F 118 is connected to a communication I/F 210 of a printer 200 and inputs and outputs information such as printing data to the printer 200. As the standard of the communication I/F 118 and the communication I/F 210, a universal serial bus (USB), a short-range radio communication standard, or the like can be used. The communication of the communication I/F 118 and the communication I/F 210 may be wired or wireless or may be network communication such as a local area network (LAN) or the Internet.

The profile adjustment program PR0 illustrated in FIG. 1 causes the host device 100 to realize a first designation function FU1, a second designation function FU2, a first target acceptance function FU3, a second target acceptance function FU4, an adjustment range designation function FU5, a coefficient setting function FU6, and a profile adjustment function FU7.

The host device 100 includes a computer such as a personal computer (including a tablet terminal). The host device 100 may include all the constituent elements 111 to 118 within a single casing and may also be configured as a plurality of devices separated to be able to communicate with each other. Even when the printer is the host device 100, the technology can be embodied.

The printer 200 illustrated in FIG. 1 is assumed to be an ink jet printer that ejects (discharges) cyan (C) ink, magenta (M) ink, yellow (Y) ink, and black (K) ink as color materials from a recording head 220 and form an output image IM0 corresponding to printing data. When ink of cyan, magenta, yellow, and black (CMYK) is supplied from ink cartridges Cc, Cm, Cy, and Ck, respectively, the recording head 220 ejects ink droplets 280 of CMYK from nozzles Nc, Nm, Ny, and Nk. When the ink droplets 280 are landed on a print substrate ME1, ink dots are formed on the print substrate ME1. As a result, it is possible to obtain a printing matter that has an output image IM0 on the print substrate ME1.

(3) Specific Example of Color Management System

Next, an example of a color management system to which the technology can be applied will be described with reference to FIGS. 2 and 3.

Figure 2:
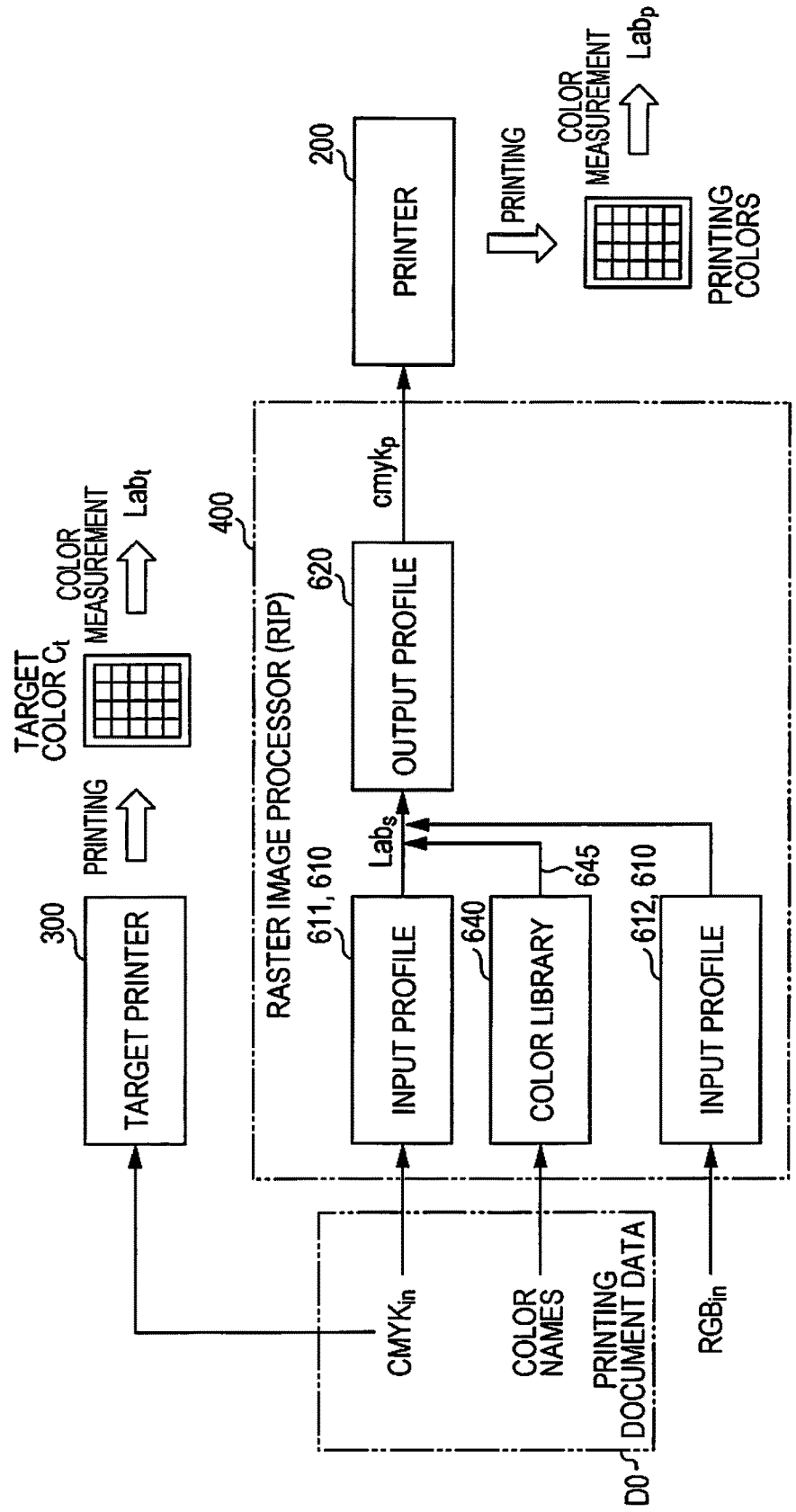
FIG. 2 is a diagram schematically illustrating an example of a color management flow.
Figure 3:
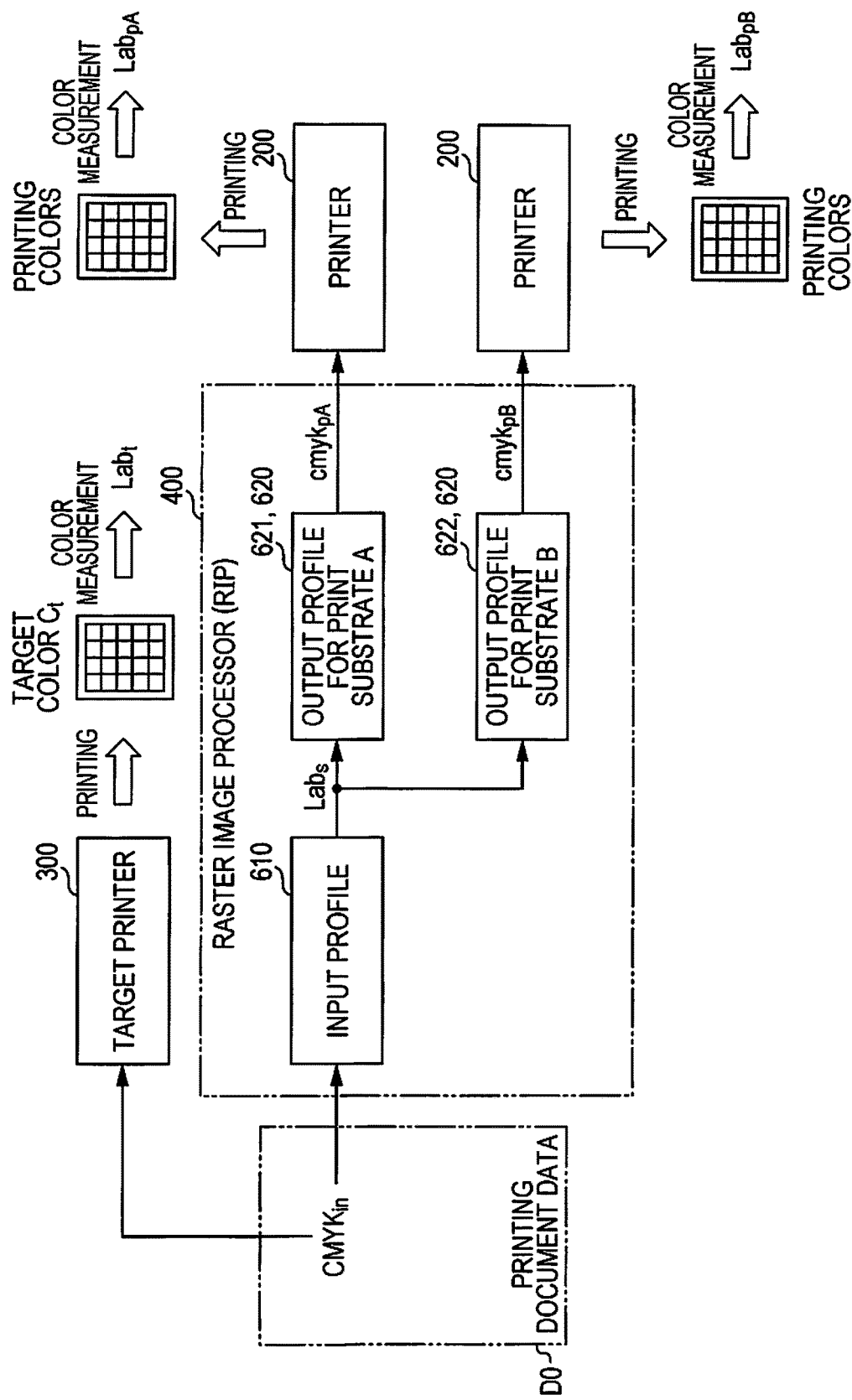
FIG. 3 is a diagram schematically illustrating an example of another color management flow.

In the color management system illustrated in FIGS. 2 and 3, a raster image processor (RIP) 400 converts printing document data D0 into output data indicating printing colors cyan, magenta, yellow, and black ($cmyk_p$) and causes the ink jet printer 200 to form a printing matter. The printing document data D0 expresses process colors $CMYK_{in}$ for reproducing a targeting color (target color $C_t$) with ink (color materials) of CMYK of a target printer 300 which is an example of a color matching target device. In the printing document data D0, the names of colors of a color library can also be designated. The names of the colors correspond to the spot color 645. As the color library, for example, a Pantone (registered trademark) color library can be used.

The target printer 300 is assumed to be an offset printer, but a gravure printer, a flexographic printer, or the like may be used. The target color $C_t$ is expressed with, for example, coordinate values (Lab values) of the CIE Lab color space. FIG. 2 illustrates a form in which the target printer 300 prints a color chart expressing the target color $C_t$ on a printing matter and a color measurement device measures colors of each patch of the color chart to acquire color measurement values $Lab_t$. The process colors $CMYK_{in}$ correspond to use amounts of ink of CMYK used by the target printer 300 and express coordinates of the CMYK color space which depends on the target printer 300.

The RIP 400 illustrated in FIG. 2 includes the first input profile 611, the second input profile 612, the output profile 620, and a color library 640. The input profile 610 is a generic term of the first input profile 611 and the second input profile 612. The first input profile 611 is a file that describes color characteristics of ink of CMYK used in the target printer 300. The second input profile 612 is a file that describes color characteristics of RGB which depends on a display device (not illustrated). The output profile 620 is a file that describes color characteristics of ink used in the ink jet printer 200. In the input profile 610 and the output profile 620, for example, a data format of an ICC profile can be used. The color library 640 is a file that describes the spot color 645 corresponding to the names of colors. The spot color 645 is expressed with Lab values.

The process colors $CMYK_{in}$ of the printing document data D0 are converted into colors $Lab_s$ of the Lab color space according to the first input profile 611. Process colors $RGB_{in}$ indicating intensities of the three primary colors red (R), green (G), and blue (B) serving as an additive mixture of colors are converted into the colors $Lab_s$ of the Lab color space according to the second input profile 612. The names of the colors are converted into the colors $Lab_s$ of the Lab color space according to the color library 640. The colors Labs are converted into the printing colors $cmyk_p$ according to the output profile 620. When the printer 200 uses ink of a total of four colors CMYK, the printing colors $cmyk_p$ are output to the printer 200 to be reproduced on a printing matter. FIG. 2 illustrates a form in which the printer 200 prints a color chart expressing the printing colors $cmyk_p$ on a print substrate and a color measurement device measures each patch of the color chart to acquire color measurement values $Lab_p$. When the printer 200 also uses ink such as light cyan (Lc), light magenta (Lm), dark yellow (Dy), and light black (Lk), and the RIP 400 or the printer 200 classifies the printing colors $cmyk_p$ into dark colors and light colors, the printer 200 can reproduce the printing colors $cmyk_p$ on a printing matter. Of course, the printing colors are not limited to the total of four colors of CMYK.

The RIP 400 has not only the process colors $CMYK_{in}$ but also, for example, process colors expressing use amounts of color materials of only the three primary colors CMY (referred to as $CMY_{in}$) which are subtractive mixture of colors and an input profile for converting coordinate values of the Lab color space. Accordingly, the RIP 400 can convert the process colors $CMY_{in}$ or the like into the printing colors $cmyk_p$ via the Lab color space. In addition, the RIP 400 can also input the colors $Lab_s$ of the Lab color space and convert the colors $Lab_s$ into the printing colors $cmyk_p$.

The RIP 400 illustrated in FIG. 3 includes an input profile 610, a first output profile 621 for a print substrate A, and a second output profile 622 for a different kind of print substrate B from the print substrate A. The output profile 620 is a generic term of the first output profile 621 ad the second output profile 622. The input profile 610 is a file that describes color characteristics of ink of CMYK used in the target printer 300. The first output profile 621 is a file that describes color characteristics of ink used to reproduce a target color $C_t$ when the ink jet printer 200 uses the print substrate A. When the print substrate A is assumed to be used, the colors $Lab_s$ of the Lab color space are converted into printing colors $cmyk_{pA}$ according to the first output profile 621. The second output profile 622 is a file that describes color characteristics of ink used to reproduce the target color $C_t$ when the ink jet printer 200 uses the print substrate B. When the print substrate B is assumed to be used, the colors $Lab_s$ of the Lab color space are converted into printing colors $cmyk_{pB}$ according to the second output profile 622. Of course, for example, a data format of an ICC profile can be used for the output profiles 621 and 622.

As described above, colors close to colors of the target printer 300 can be reproduced by the ink jet printer 200. However, actually, expected colors may not be reproduced due to an error of a profile, a color measurement error, a variation in a printer, or the like in some cases. In these cases, conversion precision of target colors is improved by correcting the profiles 610 and 620. When the output profile 620 is corrected, it is considered that $Lab_s$ values in a profile connection space (PCS) are set as target values, color differences between both the colors are calculated using results ($Lab_{pA}$ and $Lab_{pB}$) obtained by measuring colors printed by the printer 200 as current values, and the output profile 620 is corrected to reduce the color differences. When the input profile 610 is corrected, it is considered that data of the color chart is converted into the input profile 610 and the output profile 620, the color chart is printed, color differences between color measurement results ($Lab_{pA}$ and $Lab_{pB}$) of each patch and target saturation values ($Lab_t$) are calculated, and the input profile 610 is corrected to reduce the color differences. Here, the measurement results $Lab_{pA}$ indicate color measurement values of the patch formed on the print substrate A and the measurement result $Lab_{pB}$ indicate color measurement values of the patch formed on the print substrate B.

Here, expected colors may not be obtained or it takes some time due to the following reasons.

Reason 1: Since it is necessary to measure colors of printed results, a measurement instrument is necessary and color matching countermeasure may not be taken visually.

Reason 2: When the input profile 610 is corrected, a calculation result of the color differences is fed back to the input profile 610. However, when it is considered that there is a reason of an error in the output profile 620, it is necessary to also correct another input profile. (In this case, by feeding the calculation result back to the output profile 620 and correcting the output profile 620, it is not necessary to correct another output profile.)

As illustrated in FIG. 2, not only the first input profile 611 for the target printer 300 but also the second input profile 612 for a display device and the spot color 645 for directly designating colors with the Lab values are combined with one output profile 620 for a printer in some cases. In this case, when only a combination of the first input profile 611 for a target printer and the output profile 620 for a printer is optimized, a sufficient improvement in color reproduction precision may not be expected in a combination of the second input profile 612 for a display device or the spot color 645 and the output profile 620 for a printer.

As illustrated in FIG. 3, a plurality of output profiles 620 appropriate for the print substrates A and B are combined with one input profile 610 in some cases. In this case, when only a combination of the input profile 610 and the first output profile 621 is optimized, a sufficient improvement in color reproduction precision may not be expected in a combination of the input profile 610 and the second output profile 622.

In the specific example, the functions FU1 to FU7 realized by the profile adjustment program PR0 improve convenience of work for adjusting a profile when a plurality of kinds of color conversion are executed, and thus and realize further higher color reproduction precision or a gradation property.

(4) Specific Example of Profile

FIG. 4 schematically exemplifies relations between the input profile 610, the output profile 620, and the device link profile 630.

As illustrated in FIG. 4, the input profile 610 is data that defines a correspondent relation between CMYK values ($C_i$, $M_i$, $Y_i$, $K_i$) of the CMYK color space (which is an example of a first color space CS1) and Lab values ($L_i$, $a_i$, $b_i$) of an Lab color space (which is an example of the profile connection space (PCS) CS3) suitable for ink used by the target printer 300. In this case, lattice points GD1 of an A2B table are normally arranged at a substantially equal interval in a C-axis direction, an M-axis direction, a Y-axis direction, and a K-axis direction in the CMYK color space. Here, the variable i is a variable for identifying the lattice points GD1 set in the CMYK color space (CS1). The CMYK values are examples of first coordinate values. The Lab values are examples of the third coordinate values. In the input profile 610, the CMYK color space (CS1) is an example of an input color space CS4 and the Lab color space (CS3) is an example of an output color space CS5.

The output profile 620 is data that defines a correspondent relation between Lab values ($L_j$, $a_j$, $b_j$) of the Lab color space (CS3) and cmyk values ($c_j$, $m_j$, $y_j$, $k_j$) of the cmyk color space (which is example of a second color space CS2) suitable for ink used by the ink jet printer 200. In this case, lattice points GD2 of a B2A table are normally arranged at a substantially equal interval in an L-axis direction, an a-axis direction, and a b-axis direction in the Lab color space. Here, the variable j is a variable for identifying the lattice points GD2 set in the Lab color space (CS3). The reason for expression as the "cmyk color space" is to distinguish a color space suitable for ink used by the printer 200 from a color space suitable for ink used by the target printer 300. The cmyk values are examples of second coordinate values. In the output profile 620, the Lab color space (CS3) is an example of an input color space CS4 and the cmyk color space (CS2) is an example of an output color space CS5.

The device link profile 630 is data that defines a correspondent relation between CMYK values ($C_i$, $M_i$, $Y_i$, $K_i$) of the CMYK color space (CS1) and cmyk values ($c_i$, $m_i$, $y_i$, $k_i$) of an cmyk color space (CS2). Here, the variable i is a variable for identifying the lattice points GD1 set in the CMYK color space (CS1). The device link profile 630 can be obtained by linking the input profile 610 and the output profile 620. In the input profile 610, the CMYK color space (CS1) is an example of an input color space CS4 and the cmyk color space (CS2) is an example of an output color space CS5.

Figure 5:
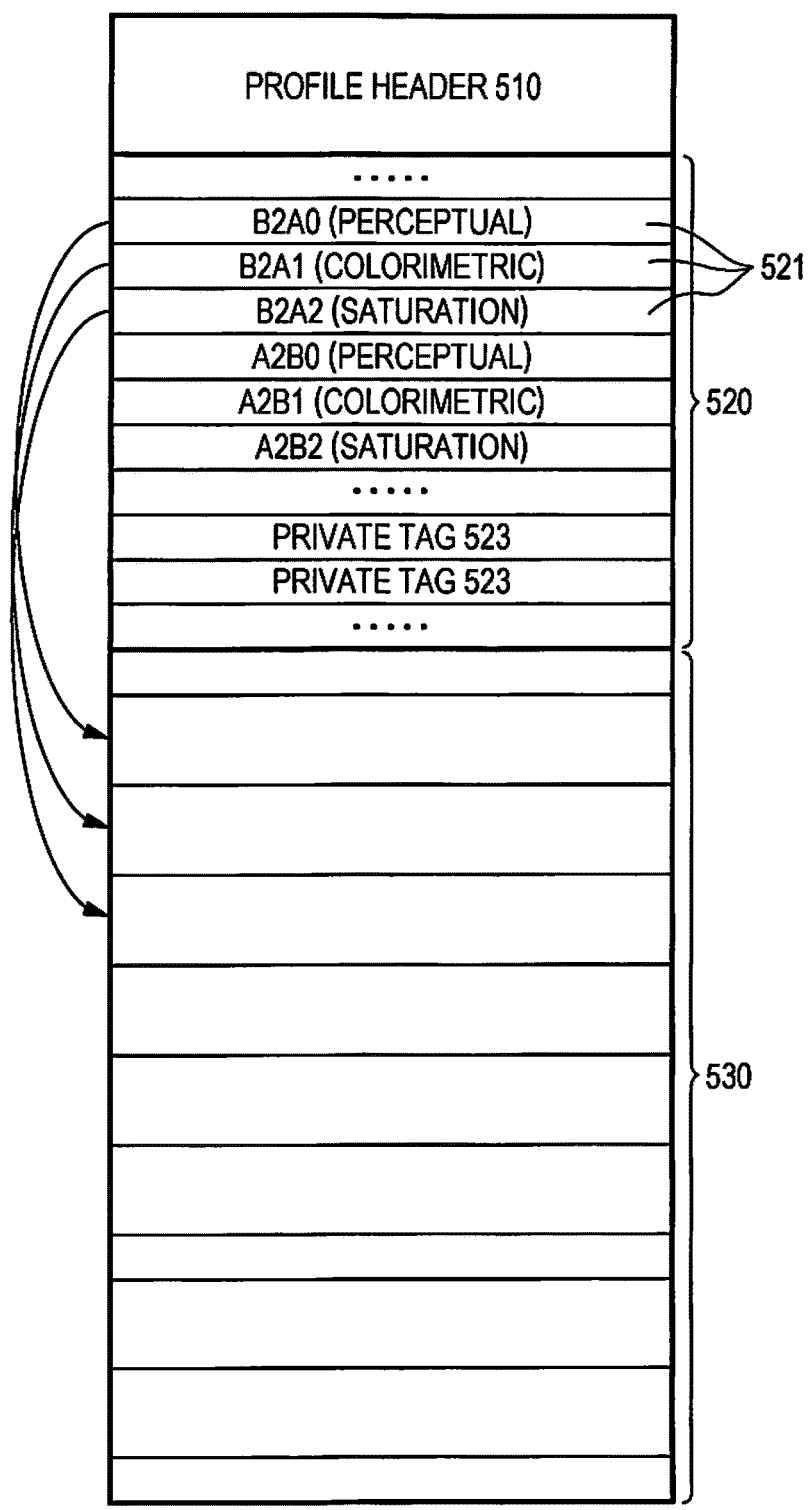
FIG. 5 is a diagram schematically illustrating a structure example of a profile.

FIG. 5 schematically exemplifies the structure of the profile 500. The profile 500 illustrated in FIG. 5 is an ICC profile and includes a profile header 510 and a tag table 520. The profile 500 includes a tag 521 which is information necessary for converting color information between PCS and a device-dependent color space. The tag 521 may include private tags 523 for customizing the profile 500.

An A2Bx tag (x is 0, 1, or 2 illustrated in FIG. 5) for the device (300 or 200) includes a color conversion table for converting a device-dependent color space (the CMYK color space or the cmyk color space) into the Lab color space, as element data 530. A B2Ax tag for the device (300 or 200) includes a color conversion table for converting the Lab color space into a device-dependent color space (the CMYK color space or the cmyk color space), as the element data 530.

The A2B0 tag and the B2A0 tag illustrated in FIG. 5 are information for executing perceptual color conversion. The perceptual color conversion is mainly used for conversion of a color gamut photo image since gradation reproduction is important. The A2B1 tag and the B2A1 tag illustrated in FIG. 5 are information for executing media-relative colorimetric color conversion or absolute colorimetric color conversion. The colorimetric color conversion is mainly used for color correction output conversion of a digital proof in which accurate color matching is obtained since the colorimetric color conversion is faithful to color measurement values. The A2B2 tag and the B2A2 tag illustrated in FIG. 5 are information for executing saturation color conversion. The saturation-important color conversion is mainly used for conversion of graph display or the like in business graphics since vividness of color is important rather than accuracy of shade.

Figure 7:
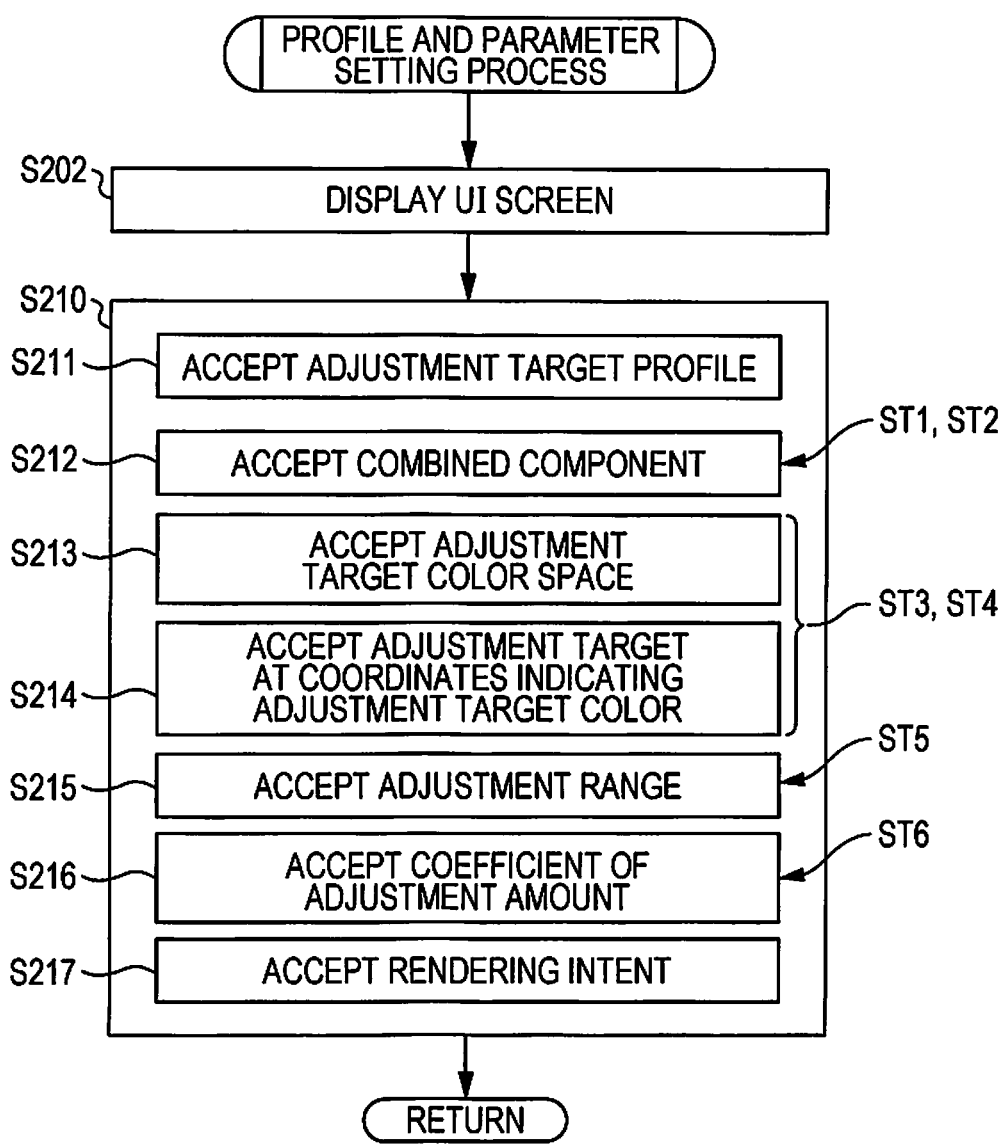
FIG. 7 is a flowchart illustrating an example of a profile and parameter setting process.

(5) Specific Example of Profile Adjustment Process Executed in Profile Adjustment System FIG. 6 illustrates an example of the profile adjustment process executed in the host device 100 illustrated in FIG. 1. FIG. 7 illustrates an example of a profile and parameter setting process executed in step S102 of FIG. 6. Of course, these processes can be appropriately changed by changing the order of the processes. FIGS. 8 and 9 illustrate an example of a user interface (UI) screen 800 displayed in step S202 of FIG. 7. The host device 100 executes a plurality of processes in parallel by multitasking. Here, step S212 of FIG. 7 corresponds to the first designation step ST1, the second designation step ST2, the first designation function FU1, the second designation function FU2, the first designation unit U1, and the second designation unit U2. Steps S213 and S214 of FIG. 7 correspond to the first target acceptance step ST3, the second target acceptance step ST4, the first target acceptance function FU3, the second target acceptance function FU4, and first target acceptance unit U3, and the second target acceptance unit U4. Step S215 of FIG. 7 corresponds to the adjustment range designation step ST5, the adjustment range designation function FU5, and the adjustment range designation unit U5. Step S216 of FIG. 7 corresponds to the coefficient setting step ST6, the coefficient setting function FU6, and the coefficient setting unit U6. Steps S104 and S120 of FIG. 6 correspond to the profile adjustment step ST7, the profile adjustment function FU7, and the profile adjustment unit U7. Hereinafter, the term "step" will be omitted.

When the profile adjustment process illustrated in FIG. 6 starts, the host device 100 executes the profile and parameter setting process illustrated in FIG. 7 (S102). When the profile and parameter setting process starts, the host device 100 displays a UI screen 800 illustrated in FIG. 8 or 9 on the display device 115 (S202 of FIG. 7). The UI screen 800 illustrated in FIG. 8 includes an adjustment target profile selection region 805, a combination designation region 810, a target acceptance region 840, a button 841 of "designate from image", an addition button 842, a deletion button 843, an adjustment range designation field 850, an intent designation field 880, an adjustment execution button 870, a history load button 881, and a history save button 882. The combination designation region 810 includes input profile selection fields 811 and 812, a spot color selection field 813, an output profile selection field 815, an adjustment data selection field 816, an adjustment target color space selection region 830, and a detailed setting button 860. On the UI screen 800 illustrated in FIG. 9, the combination designation region 810 illustrated in FIG. 8 is changed into the combination designation region 820. The combination designation region 820 includes output profile selection fields 821, 822, and 823, an input profile selection field 825, an adjustment data selection field 826, the adjustment target color space selection region 830, and the detailed setting button 860. The combination designation region 820 illustrated in FIG. 9 includes a plurality of fields (822 and 823) for selecting the second input profile 612.

When an operation of selecting "output profile" of the adjustment target profile selection region 805 is accepted by the input device 116, the host device 100 switches the UI screen 800 to the UI screen 800 illustrated in FIG. 9. When an operation of selecting "input profile" of the adjustment target profile selection region 805 is accepted by the input device 116, the host device 100 switches the UI screen 800 to the UI screen 800 illustrated in FIG. 8.

When an operation on any of the above-described fields and buttons is accepted by the input device 116 (S210) and an operation on the adjustment execution button 870 is accepted, the host device 100 ends the profile and parameter setting process. The process of S210 includes the following processes S211 to S217:

(S211) a process of accepting one of the input profile 610 and the output profile 620 as the adjustment target profile 550;
(S212) a process of accepting designation of a component combined with the adjustment target profile 550;
(S213) a process of accepting one of the CMYK color space (CS1), the cmyk color space (CS2), and the Lab color space (CS3) as the first adjustment target color space CS7 or a second adjustment target color space CS8;
(S214) a process of accepting an input of the first target T1 and the second target T2 of adjustment values at coordinates expressing the adjustment point P0 (which is an example of the adjustment target color);
(S215) a process of accepting designation of an adjustment range adjusted based on a target T0 in the adjustment target profile 550 in the first color space CS1 or the profile connection space CS3;
(S216) a process of accepting setting of a coefficient for obtaining an adjustment amount in an overlapping range of a range adjusted by the first target T1 and a range adjusted by the second target T2; and
(S217) a process of accepting one of a plurality of rendering intents for defining a correspondent relation of the adjustment target profile 550 as a designated intent.

First, the process of S211 of accepting selection of the adjustment target profile 550 will be described with reference to FIGS. 8 and 9.

When the combination designation region 810 illustrated in FIG. 8 is displayed, the host device 100 accepts an operation of selecting a common output profile in the output profile 620 stored in the storage device 114 by accepting an operation on the output profile selection field 815 by the input device 116. When the combination designation region 820 illustrated in FIG. 9 is displayed, the host device 100 accepts an operation of selecting a common output profile in the input profile 610 stored in the storage device 114 by accepting an operation on the input profile selection field 825 by the input device 116.

Next, the process of S212 of accepting designation of a component combined with the adjustment target profile 550 will be described with reference to FIGS. 8 to 11.

When the combination designation region 810 illustrated in FIG. 8 is displayed, the host device 100 accepts an operation of selecting a component in the input profile 610 and the spot color 645 stored in the storage device 114 by accepting an operation on any of the selection fields 811, 812, and 813 by the input device 116.

In the first input profile selection field 811, the first input profile 611 used for color conversion can be selected in the input profile 610 stored in the storage device 114.

In the second input profile selection field 812, the second input profile 612 used for color conversion can be selected in the input profile 610 stored in the storage device 114. When the second input profile 612 is not used for color conversion, the second input profile selection field 812 may be set as a blank.

In the spot color selection field 813, a spot color combined with the output profile 620 can be selected in the spot color 645 stored in the storage device 114. When the spot color 645 is not combined with the output profile 620, the spot color selection field 813 may be set as a blank.

When an operation on the detailed setting button 860 is accepted, the host device 100 displays a detailed setting screen 910 illustrated in FIG. 10.

The detailed setting screen 910 illustrated in FIG. 10 includes an output profile selection field 911, an input profile selection field 912, a spot color selection field 913, an addition button 914A, an addition button 914B, a distribution designation field 915, a check box 916, and an OK button 917.

Even in each input profile selection field 912, an input profile to be used for color conversion in the input profile 610 stored in the storage device 114 can be selected. An input profile selected in the input profile selection field 912 of "Input profile 1" is the first input profile 611. An input profile selected in the input profile selection field 912 of "Input profile 2" is the second input profile 612. When the second input profile 612 is not used for color conversion, the input profile selection field 912 of "Input profile 2" may be set as a blank. When an operation on the addition button 914A is accepted, the host device 100 increases the input profile selection field 912 and accepts addition of the second input profile 612 to be used for color conversion. In the spot color selection field 913, a spot color combined with the output profile 620 can be selected in the spot color 645 stored in the storage device 114. When the spot color 645 is not combined with the output profile 620, the spot color selection field 813 may be set as a blank. When an operation on the addition button 914B is accepted, the host device 100 increases the spot color selection field 913 and accepts addition of the spot color 645 combined with the output profile 620.

When an operation on the OK button 917 is accepted, the host device 100 returns the screen to the UI screen 800 illustrated in FIG. 8.

As described above, the first input profile 611 is designated as the first component combined with the output profile 620 in the first input profile selection field 811, and the second input profile 612 and the spot color 645 are designated as the second component combined with the output profile 620 in the selection fields 812 and 813.

When the combination designation region 820 illustrated in FIG. 9 is displayed, the host device 100 accepts an operation of selecting a component in the output profile 620 stored in the storage device 114 by accepting an operation on the output profile selection fields 821, 822, and 823 by the input device 116.

In the first output profile selection field 821, the first output profile 621 to be used for color conversion in the output profile 620 stored in the storage device 114 can be selected.

In each of the second output profile selection fields 822 and 823, the second output profile 622 to be used for color conversion in the output profile 620 stored in the storage device 114 can be selected. When only one second output profile 622 can be used, the second output profile selection field 823 may be set as a blank.

When an operation on the detailed setting button 860 is accepted, the host device 100 displays a detailed setting screen 920 illustrated in FIG. 11.

The detailed setting screen 920 illustrated in FIG. 11 includes an input profile selection field 921, an output profile selection field 922, an addition button 924, a distribution designation field 925, a check box 926, and an OK button 927.

Even in each output profile selection field 922, an output profile to be used for color conversion in the output profile 620 stored in the storage device 114 can be selected. An output profile selected in the output profile selection field 922 of "Output profile 1" is the first output profile 621. An output profile selected in the output profile selection field 922 of "Output profile 2" and "Output profile 3" is the second output profile 622. When only one second output profile 622 can be used, the output profile selection field 922 of "Output profile 3" may be set as a blank. When an operation on the addition button 924 is accepted, the host device 100 increases the output profile selection field 922 and accepts addition of the second output profile 622 to be used for color conversion.

When an operation on the OK button 927 is accepted, the host device 100 returns the screen to the UI screen 800 illustrated in FIG. 9.

As described above, the first output profile 621 is designated as the first component combined with the input profile 610 in the first output profile selection field 821, and the second output profile 622 is designated as the second component combined with the input profile 610 in the second output profile selection fields 822 and 823.

Figure 18A:
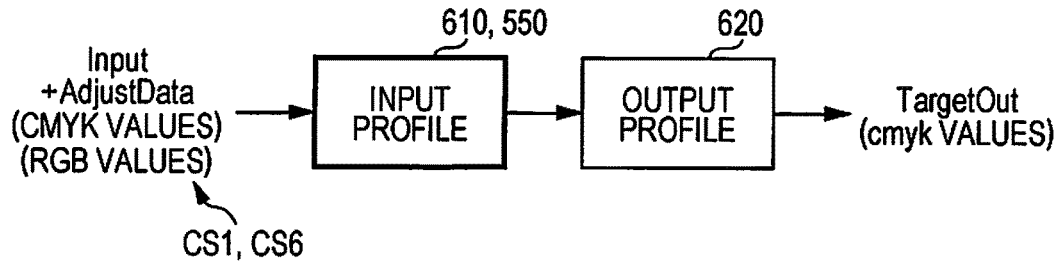
FIGS. 18A to 18C are diagrams schematically illustrating calculation examples of target output values according to adjustment target color space.
Figure 18B:
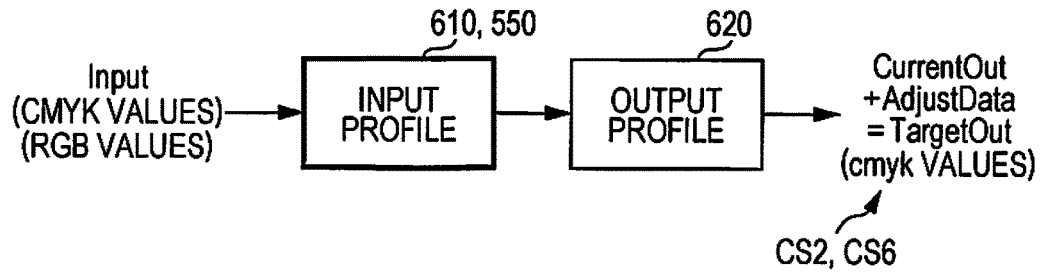
Figure 18C:
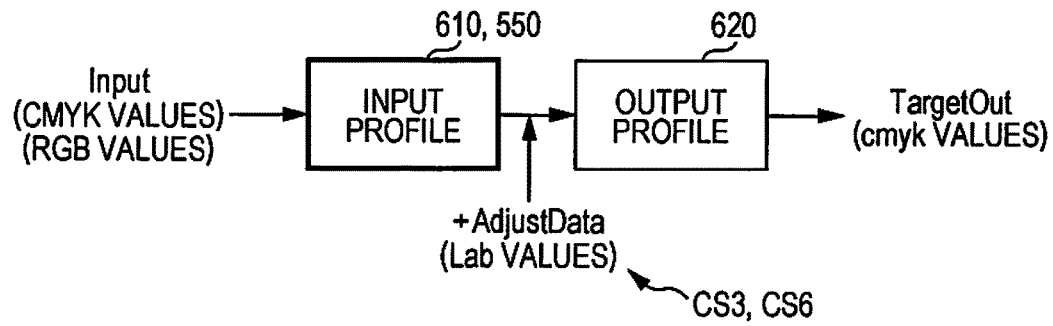

Next, the process of S213 of accepting designation of the first adjustment target color space CS7 or the second adjustment target color space CS8 will be described with reference to FIGS. 8 and 9. As illustrated in FIGS. 18A to 18C, an adjustment target color space CS6 is a generic term of the adjustment target color spaces CS7 and CS8. In the combination designation regions 810 and 820 illustrated in FIGS. 8 and 9, a solid triangle is affixed to a location not selected as the adjustment target color space CS6 and a dotted triangle is affixed to a location not selected as the adjustment target color space CS6.

In the combination designation region 810 illustrated in FIG. 8, when the first input profile 611 selected in the first input profile selection field 811 is combined with the output profile 620 selected in the output profile selection field 815, the host device 100 accepts one of the CMYK color space (CS1), the cmyk color space (CS2), and the Lab color space (CS3) as the first adjustment target color space CS7. FIG. 8 illustrates the CMYK color space designated as the first adjustment target color space CS7 in a combination of a first input profile "Input_1.icc" and an output profile "Output_0.icc".

When the second input profile 612 selected in the second input profile selection field 812 is combined with the output profile 620 selected in the output profile selection field 815, the host device 100 accepts one of the CMYK color space (CS1), the cmyk color space (CS2), and the Lab color space (CS3) as the second adjustment target color space CS8. FIG. 8 illustrates the cmyk color space designated as the second adjustment target color space CS8 in a combination of a second input profile "Input_2.icc" and the output profile "Output_0.icc".

When the spot color 645 selected in the spot color selection field 813 is combined with the output profile 620 selected in the output profile selection field 815, one of the cmyk color space (CS2) and the Lab color space (CS3) is accepted as the second adjustment target color space CS8. FIG. 8 illustrates the Lab color space designated as the second adjustment target color space CS8 in a combination of a spot color "NamedColor_1.icc" and the output profile "Output_0.icc".

In the combination designation region 820 illustrated in FIG. 9, when the input profile 610 selected in the input profile selection field 825 is combined with the first output profile 621 selected in the first output profile selection field 821, the host device 100 accepts one of the CMYK color space (CS1), the cmyk color space (CS2), and the Lab color space (CS3) as the first adjustment target color space CS7. FIG. 9 illustrates the CMYK color space designated as the first adjustment target color space CS7 in a combination of an input profile "Input_0.icc" and a first output profile "Output_1.icc".

When the input profile 610 selected in the input profile selection field 825 is combined with the second output profile 622 selected in the second output profile selection fields 822 and 823, one of the CMYK color space (CS1), the cmyk color space (CS2), and the Lab color space (CS3) is accepted as the second adjustment target color space CS8. FIG. 9 illustrates the cmyk color space designated as the second adjustment target color space CS8 in the case of the second output profile "Output_1.icc" and the Lab color space designated as the second adjustment target color space CS8 in the case of the second output profile "Output_2.icc".

As described above, one of the first color space CS1, the second color space CS2, and the profile connection space CS3 is designated as the first adjustment target color space CS7.

Further, the process of S214 of accepting an input of the first target T1 and the second target T2 of the adjustment values at coordinates indicating the adjustment point P0 will be described with reference to FIGS. 8, 9, 12, 13, and the like. Here, FIG. 12 schematically exemplifies the target acceptance region 840 when the output profile 620 is set as an adjustment target. FIG. 13 schematically exemplifies the target acceptance region 840 when the input profile 610 is set as an adjustment target. The target T0 is a generic term of the targets T1 and T2.

One of "absolute value" and "relative value" can be selected in the adjustment data selection field 816 in the output profile selection field 815 illustrated in FIG. 8 and the adjustment data selection field 826 in the input profile selection field 825 illustrated in FIG. 9. The "absolute value" is an option for accepting the adjustment target T0 as the coordinate values of a color space. The "relative value" is an option for accepting the adjustment target T0 as a difference from the current coordinate values of the color space.

The host device 100 executes a process of changing an input item of the target acceptance region 840 by selection in the above-described combination designation regions 810 and 820. When "absolute value" is selected in the adjustment data selection fields 816 and 826, as illustrated in FIGS. 12 and 13, an input field of the coordinate values of the adjustment target T0 is displayed in the target acceptance region 840 along with a display field of the current coordinate values of the color space. For example, when the first input profile in FIG. 12 is "Input_1.icc" and the first adjustment target color space CS7 is the CMYK color space (CS1), an input field of the coordinate values (T_C, T_M, T_Y, T_K) of the first target T1 of the CMYK color space is displayed in the target acceptance region 840. When the second input profile is "Input_2.icc" in FIG. 12, an input field of the coordinate values (T_c, T_m, T_y, T_k) of the second target T2 of the cmyk color space (CS2) is displayed in the target acceptance region 840. When the spot color is "NamedColor_1.icc" in FIG. 12, an input field of coordinate values (T_L, T_a, T_b) of the second target T2 of the Lab color space (CS3) is displayed in the target acceptance region 840. When the first output profile is "Output_1.icc" in FIG. 13, the input field of the coordinate values (T_C, T_M, T_Y, T_K) of the first target T1 of the CMYK color space is displayed in the target acceptance region 840. When the second output profile is "Output_2.icc" in FIG. 13, the input field of coordinate values (T_c, T_m, T_y, T_k) of the second target T2 of the cmyk color space is displayed in the target acceptance region 840.

When the "relative value" is selected in the adjustment data selection fields 816 and 826, as illustrated in FIGS. 8 and 9, an input field of coordinate values (ΔL, Δa, Δb in FIGS. 8 and 9) of the adjustment target T0 which are differences from the current coordinate values of the color space is displayed in the target acceptance region 840. FIGS. 8 and 9 illustrate examples of a case in which the Lab color space is selected as the adjustment target color space CS6.

FIG. 14A schematically exemplifies a form in which the adjustment point P0 for setting the adjustment target T0 is set in the CMYK color space (CS1). Here, since the CMYK color space is a 4-dimensional color space, a 3-dimensional virtual space formed by C, M, and Y axes is illustrated in FIG. 14A.

For example, when an operation on the button 841 of "designate from image" on the UI screen 800 illustrated in FIGS. 8 and 9 is accepted, the host device 100 displays a screen for schematically showing the CMYK color space (CS1) on the display device 115, acquires the CMYK values in response to an operation by the input device 116, and updates information regarding the target acceptance region 840. When the new adjustment point P0 is designated, the host device 100 grants a corresponding ID (identification information) and displays the acquired CMYK values and the coordinate values of the output color space CS5 requested from the CMYK value in correspondence to the ID in the target acceptance region 840. When the addition button 842 is operated, the host device 100 adds the ID to increase an input field corresponding to the added ID in the target acceptance region 840. When the deletion button 843 is operated, the host device 100 accepts designation of the ID to be deleted and deletes the input field corresponding to the ID designated.

When an operation on the history load button 881 is accepted, the host device 100 reads the adjustment history 700 of the adjustment stored in the storage device 114 and adds the adjustment history 700 in the target acceptance region 840. When an operation on the history save button 882 is accepted, the host device 100 stores information regarding the target acceptance region 840 as the adjustment history 700 in the storage device 114.

The adjustment target T0 accepted in the target acceptance region 840 is changed as follows depending on selected content of the adjustment target color space selection region 830 and selected content of the adjustment data selection fields 816 and 826.

(Selected Content 1)

The CMYK color space is selected as the adjustment target color space CS6 and the "absolute value" is selected as an input of the adjustment target T0. In this case, the input of the adjustment target T0 is the CMYK values (which are assumed to be T_C, T_M, T_Y, T_K). The CMYK values are expressed in, for example, 0 to 100%.

(Selected Content 2)

The CMYK color space is selected as the adjustment target color space CS6 and the "relative value" is selected as an input of the adjustment target T0. In this case, the input of the adjustment target T0 is differences (which are assumed to be ΔC, ΔM, ΔY, ΔK) of the target values (T_C, T_M, T_Y, T_K) of the current values (C_C, C_M, C_Y, C_K) of the CMYK values.

(Selected Content 3)

The RGB color space is selected as the adjustment target color space CS6 and the "absolute value" is selected as an input of the adjustment target T0. In this case, the input of the adjustment target T0 is the RGB values (which are assumed to be T_R, T_G, T_B). The RGB values are expressed in, for example, 0 to 100%.

(Selected Content 4)

The RGB color space is selected as the adjustment target color space CS6 and the "relative value" is selected as an input of the adjustment target T0. In this case, the input of the adjustment target T0 is differences (which are assumed to be ΔR, ΔG, and ΔB) of the target values (T_R, T_G, T_B) of the current values (C_R, C_G, C_B) of the RGB values.

(Selected Content 5)

The Lab color space is selected as the adjustment target color space CS6 and the "relative value" is selected as an input of the adjustment target T0. In this case, the input of the adjustment target T0 is the Lab values (T_L, T_a, T_b).

(Selected Content 6)

The Lab color space is selected as the adjustment target color space CS6 and the "relative value" is selected as an input of the adjustment target T0. In this case, the input of the adjustment target T0 is differences (which are assumed to be ΔL, Δa, and Δb) of the target values (T_L, T_a, T_b) of the current values (C_L, C_a, C_b) of the Lab values.

(Selected Content 7)

The cmyk color space is selected as the adjustment target color space CS6 and the "relative value" is selected as an input of the adjustment target T0. In this case, the input of the adjustment target T0 is the cmyk values (T_c, T_m, T_y, T_k). The cmyk values are expressed in, for example, 0 to 100%.

(Selected Content 8)

The cmyk color space is selected as the adjustment target color space CS6 and the "relative value" is selected as an input of the adjustment target T0. In this case, the input of the adjustment target T0 is differences (which are assumed to be Δc, Δm, Δy, Δk) of the target values (T_c, T_m, T_y, T_k) of the current values (C_c, C_m, C_y, C_k) of the cmyk values.

As illustrated in FIG. 12, an input of the first target T1 of the adjustment values at the coordinates indicating the adjustment point P0 is accepted in the input field of the first target T1 with regard to the first input profile 611. An input of the second target T2 of adjustment values at the coordinates indicating the adjustment point P0 is accepted in the input field of the second target T2 with regard to the second input profile 612. An input of the second target T2 of adjustment values at the coordinates indicating the adjustment point P0 is accepted in the input field of the second target T2 with regard to the spot color 645.

As illustrated in FIG. 13, an input of the first target T1 of the adjustment values at the coordinates indicating the adjustment point P0 is accepted in the input field of the first target T1 with regard to the first output profile 621. An input of the second target T2 of adjustment values at the coordinates indicating the adjustment point P0 is accepted in the input field of the second target T2 with regard to the second output profile 622.

Further, the process of S215 will be described with reference to FIGS. 8, 9, 12, 13, and the like.

The host device 100 accepts designation of whether the adjustment range A0 adjusted based on the adjustment target T0 is the whole color space in the adjustment range designation field 850. A plurality of designation items of the adjustment range designation field 850 illustrated in FIGS. 8 and 9 include "whole input space" and "radius". When the "whole input space" is designated, the adjustment range A0 is set to the whole color space. When the "radius" is designated, the host device 100 accepts an input of a radius set using the adjustment point P0 as a base point in the input field of "Radius" of the target acceptance region 840, as illustrated in FIGS. 12 and 13. This radius is expressed in, for example, 0 to 100% of the relative value of a Euclid distance in the first color space CS1. FIG. 14A schematically illustrates an example of the adjustment range A0 when the radius (Radius) is designated.

For example, when the input color space CS4 of the selected input profile 610 is the CMYK color space, the radius can be expressed with the relative value of the Euclid distance in the CMYK color space. When the input color space CS4 of the selected input profile 610 is the RGB color space, the radius can be expressed with the relative value of the Euclid distance in the RGB color space. When the spot color 645 is selected as the second component combined with the output profile 620, the radius can be expressed with the relative value of the Euclid distance in the Lab color space.

As described above, the adjustment range A0 adjusted based on the first target T1 and the second target T2 is designated in the adjustment target profile 550 in the first color space CS1 or the profile connection space CS3.

Further, the process of S216 of accepting setting of coefficients (the weight a1, a2, and a3 in FIG. 14B) for obtaining the adjustment amount D in the overlapping ranges (in FIG. 14B, the overlapping ranges A4 to A7) of the range (in FIG. 14B, the adjustment range A1) adjusted by the first target T1 and the ranges (in FIG. 14B, the adjustment range sA2 and A3) adjusted by the second target T2 will be described with reference to FIGS. 10, 11, and 14B.

In the distribution designation field 915 illustrated in FIG. 10, a weight can be designated for an adjustment amount indicating the degree of adjustment by the adjustment target T0 with regard to each component combined with the output profile 620. In the example illustrated in FIG. 10, a weight a1=50.0% is designated for the first input profile "Input_1.icc", a weight a2=20.0% is designated for the second input profile "Input_2.icc", and a weight a3=30.0 is designated for the spot color "NamedColor_1.icc". When an operation of checking the check box 916 is executed, the weight of the distribution designation field 915 is equally distributed. For example, when three components are designated with the input profile 610 and the spot color 645, a weight of each distribution designation field 915 is 33.3%.

In the distribution designation field 925 illustrated in FIG. 11, a weight can be designated for an adjustment amount indicating the degree of adjustment by the adjustment target T0 with regard to each component combined with the input profile 610. In the example illustrated in FIG. 11, the weight a1=50.0% is designated for the first output profile "Output_1.icc", the weight a2=20.0% is designated for the second output profile "Output_2.icc", and the weight a3=30.0% is designated for the second output profile "Output_3.icc". When an operation of checking the check box 926 is executed, the weight of the distribution designation field 915 is equally distributed.

As illustrated in FIG. 14B, the adjustment amount D in the overlapping A4 to A7 can be calculated by the following expressions, for example.

$$D=(a2 \times D2+a3 \times D3)/(a2+a3) \quad \text{(case of range A4)}$$

$$D=(a1 \times D1+a3 \times D3)/(a1+a3) \quad \text{(case of range A5)}$$

$$D=(a1 \times D1+a2 \times D2)/(a1+a2) \quad \text{(case of range A6)}$$

$$D=(a1 \times D1+a2 \times D2+a3 \times D3)/(a1+a2+a3) \quad \text{(case of range A7)}$$

As described above, the coefficients (a1, a2, a3) for the first adjustment amount (D1) indicating the degree of adjustment by the first target T1 and the second adjustment amounts (D2 and D3) indicating the degree of adjustment by the second target T2 are set.

Further, the process of S217 of accepting selection of a designation intent will be described with reference to FIGS. 8 and 9.

The host device 100 accepts designation of a rendering intent for defining a correspondent relation of the adjustment target profile 550 in the intent designation field 880. A plurality of designation items of the intent designation field 880 illustrated in FIGS. 8 and 9 are three kinds of items, "Perceptual", "Relative Colorimetric", and "Saturation". Of course, the designation items may include "Absolute Colorimetric", and some of "Perceptual", "Relative Colorimetric", and "Saturation" may not be included in the designation items. FIGS. 8 and 9 illustrate examples in which "Perceptual" is designated as the designation intent.

As described above, one of the plurality of rendering intents for defining the correspondent relation of the adjustment target profile 550 is accepted as a designation intent.

When an operation on the adjustment execution button 870 illustrated in FIGS. 8 and 9 is accepted, the host device 100 ends the process of S210 of FIG. 7 and executes a process subsequent to S104 of FIG. 6. Here, when "Perceptual" is designated in the intent designation field 880, the host device 100 uses information appropriate for the A2B0 and B2A0 tags illustrated in FIG. 5 in the profile 500 in the process subsequent to S104. When "Relative Colorimetric" is designated in the intent designation field 880, the host device 100 uses information appropriate for the A2B1 and B2A1 tags illustrated in FIG. 5 in the profile 500 in the process subsequent to S104. When "Saturation" is designated in the intent designation field 880, the host device 100 uses information appropriate for the A2B2 and B2A2 tags illustrated in FIG. 5 in the profile 500 in the process subsequent to S104.

Hereinafter, the process subsequent to S104 will be described with reference to FIGS. 15 to 22B. Here, FIG. 15 exemplifies a process of generating a correspondent data set of the input value Input_P and the adjustment amount Δcmyk setting the output profile 620 as the adjustment target profile 550. FIG. 16 exemplifies a process of generating a correspondent data set of an input value Input_P and the adjustment amount ΔLab setting the input profile 610 as the adjustment target profile 550.

First, the host device 100 obtains current output values CurrentOut according to a combination designated with the combination designation regions 810 and 820 at each adjustment point P0 input in the target acceptance region 840 (S104 of FIG. 6). This is because the adjustment is executed using the output colors $cmyk_p$ corresponding to the colors of the output image IM0 formed on the print substrate ME1 as a reference. When there is information appropriate for the designation intent in the profile, the color conversion is executed according to the information appropriate for the designation intent.

Here, as illustrated in FIG. 17C, conversion according to a profile (for example, an ICC profile) is assumed to be indicated by $f_{icc}$ (first, second, and third arguments). Here, the first argument indicates a profile to be used. In the first argument, InputProfile indicates an input profile and OutputProfile indicates an output profile. In the second argument, A2B indicates conversion from device colors to device-independent colors and B2A indicates conversion from device-independent colors to device colors. In the third argument, Input indicates input values (CMYK, RGB, Lab, or the like) of the adjustment point P0.

As illustrated in FIGS. 17A and 17B, when a combination of the profiles 610 and 620 for color conversion is designated (a-1) and (a-2), the input value Input of each adjustment point P0 is the CMYK values (which are assumed to be Cp, Mp, Yp, Kp) or the RGB values (which are assumed to be Rp, Gp, Bp). In this case, the current output values CurrentOut are the cmyk values (cp, mp, yp, kp).

In the foregoing (a-1) and (a-2), when the adjustment target profile 550 is either the input profile 610 or the output profile 620, the current output values CurrentOut can be calculated by the following expression (see FIG. 17C):

CurrentOut=$f_{icc}$(OutputProfile,B2A,$f_{icc}$(InputProfile, A2B,Input)).

Although not illustrated, when a combination of the spot color 645 and the output profile 620 is designated for the color conversion, the input values Input at each adjustment point P0 are Lab values (which are assumed to be Lp, ap, bp). In this case, the current output values CurrentOut are cmyk values (where are assumed to be cp, mp, yp, kp). The current output values CurrentOut are can be calculated by the following expression:

CurrentOut=$f_{icc}$(OutputProfile,B2A,Input).

After the current output values CurrentOut are calculated, the host device 100 obtains the target output values TargetOut according to the combination designated in the combination designation regions 810 and 820 at each adjustment point P0 input to the target acceptance region 840 (S106). This is because the adjustment is executed using the output colors $cmyk_p$ corresponding to the colors of the output image IM0 formed on the print substrate ME1 as a reference. When there is information appropriate for the designation intent in the profile, the color conversion is executed according to the information appropriate for the designation intent.

For example, as illustrated in FIG. 18A, when the combination of the profiles 610 and 620 is designated for the color conversion and the first color space CS1 is designated in the adjustment target color space CS6 (a-1-1), the adjustment amount AdjustData is added to the CMYK values (Cp, Mp, Yp, Kp) or the RGB values (Rp, Gp, Bp) in the first color space CS1. The adjustment amount AdjustData is expressed with relative values (ΔCp, ΔMp, ΔYp, ΔKp) and relative values (ΔRp, ΔGp, ΔBp). The CMYK values after the adjustment are expressed as (Cp+ΔCp, Mp+ΔMp, Yp+ΔYp, Kp+ΔKp) and the RGB values after the adjustment are expressed as (Rp+ΔRp, Gp+ΔGp, Bp+ΔBp).

In the foregoing (a-1-1) case, the target output values TargetOut can be calculated by the following expression (see FIG. 19):

TargetOut=$f_{icc}$(OutputProfile,B2A,$f_{icc}$(InputProfile, A2B,Input+AdjustData)).

The foregoing expression is the same even when the adjustment target profile 550 is the output profile 620.

As illustrated in FIG. 18B, when the combination of the profiles and 610 and 620 is designated for the color conversion and the second color space CS2 is designated in the adjustment target color space CS6 (a-1-2), the adjustment amount AdjustData is added to the cmyk values (cp, mp, yp, kp) in the cmyk color space (CS2). The adjustment amount AdjustData is expressed with relative values (Δcp, Δmp, Δyp, Δkp). In the cmyk color space, the cmyk values after the adjustment are expressed as (cp+Δcp, mp+Δmp, yp+Δyp, kp+Δkp).

In the foregoing (a-1-2) case, the target output values TargetOut can be calculated by the following expression (see FIG. 19):

TargetOut=$f_{icc}$(OutputProfile,B2A,$f_{icc}$(InputProfile, A2B,Input))+AdjustData.

The foregoing expression is the same even when the adjustment target profile 550 is the output profile 620.

As illustrated in FIG. 18C, when the combination of the profiles 610 and 620 is designated for the color conversion and the third color space CS3 is designated in the adjustment target color space CS6 (a-1-3), the adjustment amount AdjustData is added to the Lab values (Lp, ap, bp) in the Lab color space (CS3). The adjustment amount AdjustData is expressed with relative values (ΔLp, Δap, Δbp). In the Lab color space, the Lab values after the adjustment are expressed as (Lp+ΔLp, ap+Δap, bp+Δbp).

In the foregoing (a-1-3) case, the target output values TargetOut can be calculated by the following expression (see FIG. 19):

TargetOut=$f_{icc}$(OutputProfile,B2A,$f_{icc}$(InputProfile, A2B,Input)+AdjustData).

The foregoing expression is the same even when the adjustment target profile 550 is the output profile 620.

Although not illustrated, when the combination of the spot color 645 and the output profile 620 (the adjustment target profile 550) is designated for the color conversion and the second color space CS2 is designated in the adjustment target color space CS6, the adjustment amount AdjustData is added to the cmyk values (cp, mp, yp, kp) in the cmyk color space (CS2). The adjustment amount AdjustData is expressed with relative values (Δcp, Δmp, Δyp, Δkp). In the cmyk color space, the cmyk values after the adjustment are expressed as (cp+Δcp, mp$_+$Δmp, yp$_+$Δyp, kp$_+$Δkp). In this case, the target output values TargetOut can be calculated by the following expression:

TargetOut=$f_{icc}$(OutputProfile,$B2A$,Input)+AdjustData.

When the combination of the spot color 645 and the output profile 620 (the adjustment target profile 550) is designated for the color conversion and the third color space CS3 is designated in the adjustment target color space CS6, the adjustment amount AdjustData is added to the Lab values (Lp, ap, bp) in the Lab color space (CS3). The adjustment amount AdjustData is expressed with relative values (ΔLp, Δap, Δbp). In the Lab color space, the Lab values after the adjustment are expressed as (Lp$_+$ΔLp, ap$_+$Δap, bp+Δbp). In this case, the target output values TargetOut can be calculated by the following expression:

TargetOut=$f_{icc}$(OutputProfile,$B2A$,Input+AdjustData).

The calculation of the target output values TargetOut can be omitted when the adjustment target T0 is expressed with the output coordinate values. The calculation of the target output values TargetOut can be executed when the adjustment target T0 is not expressed with the output coordinate values.

After the target output values TargetOut are calculated, the host device 100 acquires the input values Input_P and the adjustment target values TargetOut_P at each adjustment point P0 in the adjustment target profile 550 (S108). This is because the correspondent relation between the input values and the output values in the adjustment target profile 550 is adjusted. When there is information regarding the designation intent in the profile, the color conversion is executed according to the information appropriate for the designation intent.

As illustrated in FIG. 20A, in the (a-1) case illustrated in FIG. 17A, that is, when the combination of the profiles 610 and 620 is selected for the color conversion and the input profile 610 is designated in the adjustment target profile 550, the input values Input of the combination of the profiles 610 and 620 is used as the input value Input_P in the adjustment target profile 550. The adjustment target values TargetOut_P (the Lab values) of the adjustment target profile 550 can be calculated from the target output values TargetOut which are the cmyk values (see FIG. 20C):

Input_P=Input; and

TargetOut_P=$f_{icc}$(OutputProfile,$A2B$,TargetOut).

The reason why the adjustment target values TargetOut_P (the Lab values) of the adjustment target profile 550 are obtained from the target output values TargetOut (the cmyk values) is to execute the adjustment using the output colors cmyk$_p$ corresponding to the colors of the output image IM0 as a reference.

The current output values CurrentOut_P (the Lab values) in the adjustment target profile 550 are expressed in the following expression:

CurrentOut_P=$f_{icc}$(InputProfile,$A2B$,Input).

The adjustment amount ΔLab which are the relative values of the adjustment target T0 are expressed in the output color space CS5 of the adjustment target profile 550, TargetOut_P−CurrentOut_P is set.

As illustrated in FIG. 20B, in the (a-2) case illustrated in FIG. 17B, that is, when the combination of the profiles 610 and 620 is selected for the color conversion and the output profile 620 is designated in the adjustment target profile 550, the target output values TargetOut of the combination of the profiles 610 and 620 are used as the adjustment target values TargetOut_P in the adjustment target profile 550. The input values Input_P (the Lab values) of the adjustment target profile 550 can be calculated from the input values Input which are the CMYK values or the RGB values (see FIG. 20C):

Input_P=$f_{icc}$(InputProfile,$A2B$,Input); and

TargetOut_P=TargetOut.

The current output values CurrentOut_P (the cmyk values) in the adjustment target profile 550 are the current output values CurrentOut of the combination of the profiles 610 and 620:

CurrentOut_P=CurrentOut.

When the adjustment amounts Δcmyk which are the relative values of the adjustment target T0 are expressed in the output color space CS5 of the adjustment target profile 550, TargetOut_P−CurrentOut_P is set.

Although not illustrated, when the combination of the spot color 645 and the output profile 620 (the adjustment target profile 550) is designated for the color conversion, the input values Input which are the Lab values are used as the input values Input_P in the adjustment target profile 550 and the target output values TargetOut are used as the adjustment target values TargetOut_P in the adjustment target profile 550:

Input_P=Input; and

TargetOut_P=TargetOut.

The current output values CurrentOut_P (the cmyk values) in the adjustment target profile 550 are the current output values CurrentOut of the combination of the spot color 645 and the output profile 620:

CurrentOut_P=CurrentOut.

When the adjustment amounts Δcmyk which are relative values of the adjustment target T0 are expressed in the output color space CS5 of the adjustment target profile 550, TargetOut_P−CurrentOut_P is set.

Figure 15:
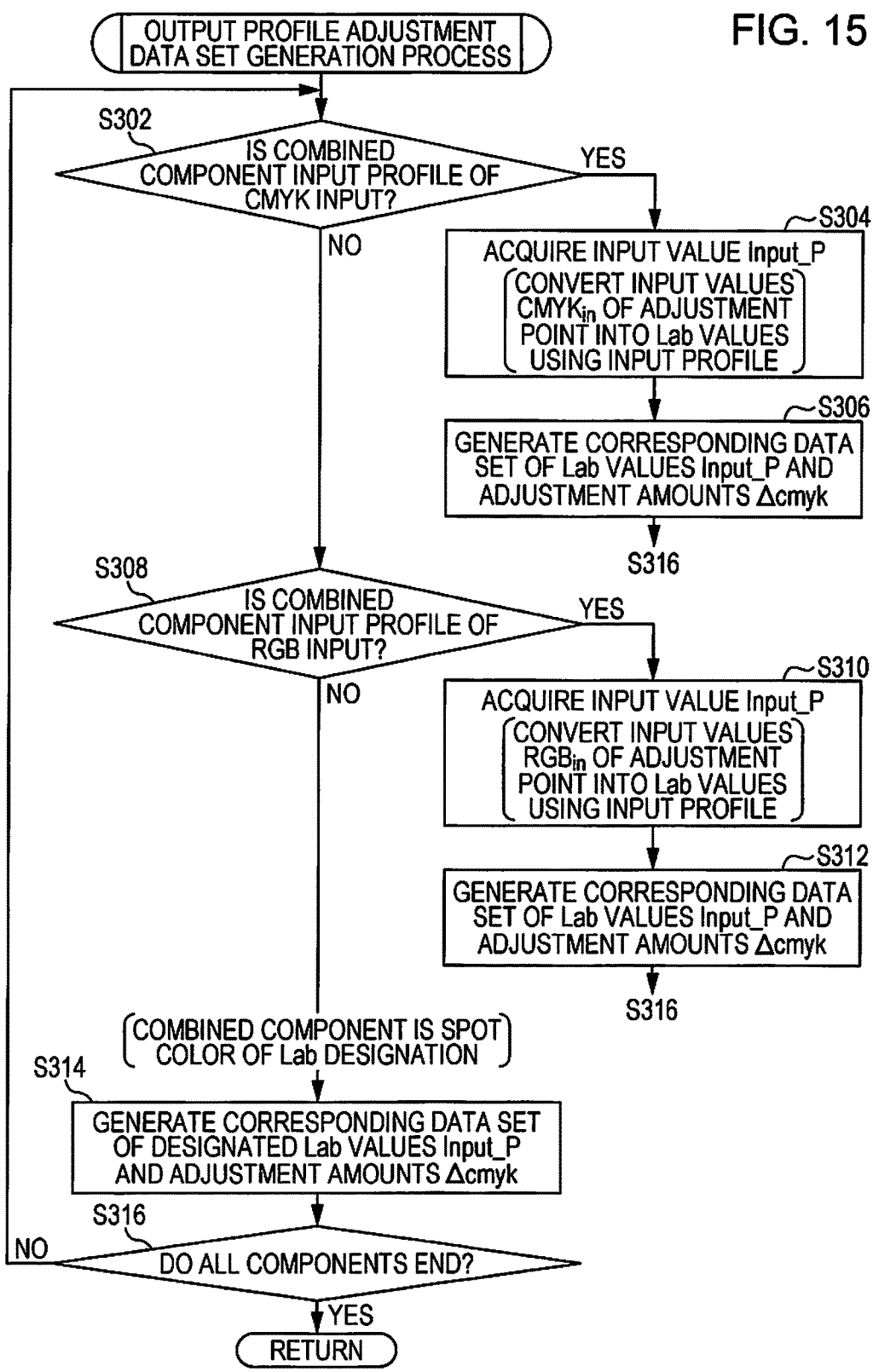
FIG. 15 is a flowchart illustrating an example of a process of generating an output profile adjustment data set.
Figure 16:
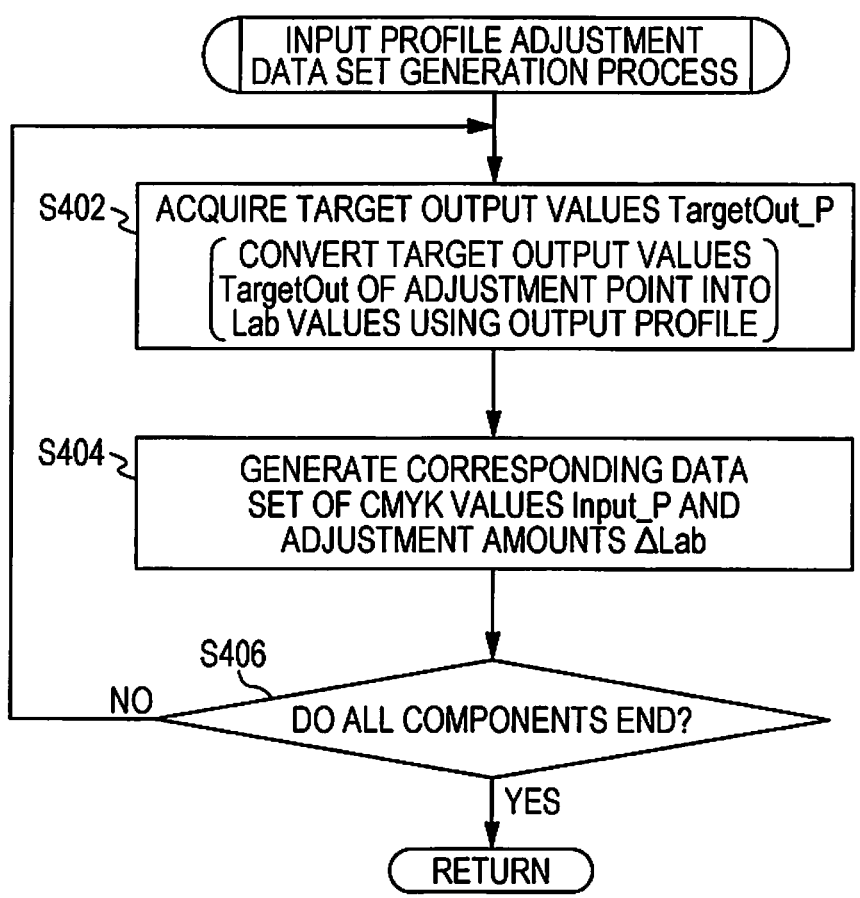
FIG. 16 is a flowchart illustrating an example of a process of generating an input profile adjustment data set.

When the output profile 620 is adjusted, as illustrated in FIG. 15, a correspondent data set of the input values Input_P and the adjustment amounts TargetOut_P−CurrentOut_P (Δcmyk) is generated according to components combined with the output profile 620. FIG. 21A exemplifies a data set SET1 in which the input values (L, a, b) and the adjustment amounts (Δc, Δm, Δy, Δk) are associated with each other with regard to each component combined with the output profile 620.

When a process of generating an output profile adjustment data set illustrated in FIG. 15 starts, the host device 100 causes the process to branch setting one component combined with the output profile 620 depending on whether the component is the input profile 610 of the CMYK input (S302). When the component is the input profile 610 of the CMYK input, the host device 100 converts the input values Input (CMYK$_{in}$) of the adjustment point P0 into the input values Input_P (the Lab values) using the input profile 610 (S304). Further, the host device 100 generates the correspondent data set SET1 of the obtained input values Input_P (the Lab values) and the adjustment amounts TargetOut_P−CurrentOut_P (Δcmyk) (S306), and the process proceeds to S316.

When the component is not the input profile 610 of the CMYK input, the host device 100 causes the process to branch depending on whether the component is the input profile 610 of the RGB input (S308). When the component is the input profile 610 of the RGB input, the host device 100 converts the input values Input (RGB$_{in}$) of the adjustment point P0 into the input values Input_P (the Lab values) using the input profile 610 (S310). Further, the host device 100 generates the correspondent data set SET1 of the obtained input values Input_P (the Lab values) and the adjustment amounts TargetOut_P−CurrentOut_P (Δcmyk) (S312), and the process proceeds to S316.

When the component is not the input profile 610 of the RGB input, the component is the spot color 645 of Lab designation. In this case, the host device 100 generates the correspondent data set SET1 of the input values Input_P which are the designated Lab values and the adjustment amounts TargetOut_P−CurrentOut_P (Δcmyk) (S314), and the process proceeds to S316.

The process of S302 to S314 is executed on all the components combined with the output profile 620 (S316).

When the input profile 610 is adjusted, as illustrated in FIG. 16, a correspondent data set of the input values Input_P which are the designated Lab values and the adjustment amounts TargetOut_P−CurrentOut_P (ΔLab) is generated at each component combined with the input profile 610. FIG. 21B exemplifies a data set SET2 in which the input values (C, M, Y, K) and adjustment amounts (ΔL, Δa, Δb) are associated with each other with regard to each component combined with the input profile 610.

When the process of generating an input profile adjustment data set, as illustrated in FIG. 16, starts, the host device 100 sets one output profile 620 combined with one input profile 610 as a target and converts the target output values TargetOut (the cmyk values) of the adjustment point P0 into the adjustment target values TargetOut_P (the Lab values) using the output profile 620 (S402). Further, the adjustment amounts TargetOut_P−CurrentOut_P (ΔLab) are obtained by subtracting the current output values CurrentOut_P (the Lab values) from the obtained adjustment target values TargetOut_P (the Lab values) to generate the correspondent data set SET2 in which the input values Input_P (the CMYK values) which are the input values Input (CMYK$_{in}$) of the adjustment point P0 and the adjustment amounts TargetOut_P−CurrentOut_P (ΔLab) (S404).

The process of S402 to S404 is executed on all the output profiles 620 combined with the input profile 610 (S406).

After the input values Input_P in the adjustment target profile 550 and the adjustment amounts TargetOut_P−CurrentOut_P are acquired, the host device 100 adjusts the adjustment range A0 of the adjustment target profile 550 based on the first target T1 and the second target T2 of the adjustment values in S110 to S112.

First, the concept that the adjustment target profile 550 is adjusted in the adjustment range A0 will be described with reference to FIGS. 22A and 22B. Here, in FIGS. 22A and 22B, the horizontal axis represents an input value along a certain coordinate axis of the input color space CS4 and the vertical axis represents an output value along a certain coordinate axis of the output color space CS5. For example, when the input color space CS4 is the CMYK color space, the horizontal axis is the C, M, Y, or K axis. When the output color space CS5 is the Lab color space, the vertical axis is the L, a, or b axis. A white circle on the horizontal axis indicates the lattice point GD0.

Figure 22A:
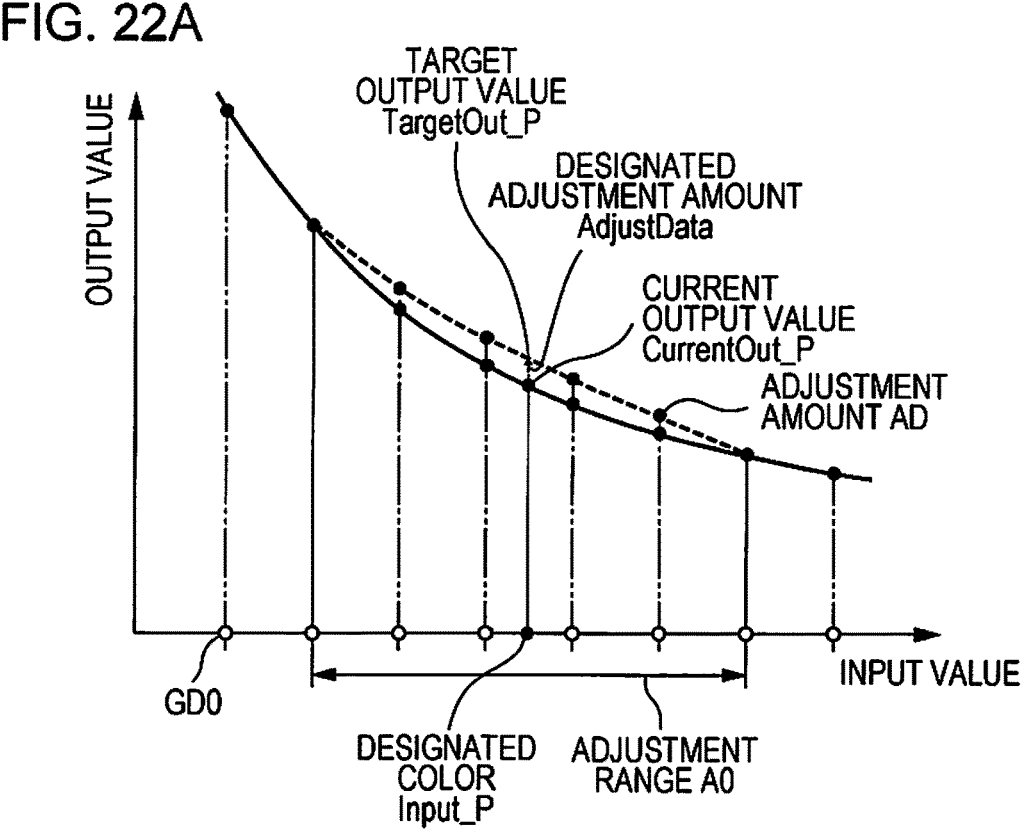
FIG. 22A is a diagram schematically illustrating an adjustment amount of each lattice point when adjustment is executed in an output color space of an adjustment target profile and FIG. 22B is a diagram schematically illustrating an adjustment amount of each lattice point when adjustment is executed in an input color space of an adjustment target profile.

FIG. 22A schematically exemplifies the adjustment amounts AD of each lattice point GD0 when the output values are adjusted. The adjustment point P0 designated by the user corresponds to the input values Input_P. When the user gives an instruction of the adjustment amounts AdjustData as the adjustment target T0, the adjustment target values TargetOut_P obtained by adding the adjustment amounts AdjustData to the current output values CurrentOut_P corresponding to the input values Input_P is set. Of course, when the adjustment target color space CS6 is the cmyk color space, the current output values CurrentOut_P and the adjustment target values TargetOut_P are expressed with the cmyk values, and the adjustment amounts AdjustData are expressed with the relative values (Δcp, Δmp, Δyp, Δkp) of the cmyk values. When the adjustment target color space CS6 is the Lab color space, the current output values CurrentOut_P and the adjustment target values TargetOut_P are expressed with the Lab values, and the adjustment amounts AdjustData are expressed with the relative values (ΔLp, Δap, Δbp) of the Lab values.

The adjustment range A0 is set in the adjustment amounts AdjustData through an input to the adjustment range designation field 850 and the target acceptance region 840 illustrated in FIGS. 8 and 9. When "radius" is designated in the adjustment range designation field 850, basically, the adjustment amounts of the output values with respect to the input values Input_P are set to the maximum and the adjustment amounts at the boundary of the adjustment range A0 are set to 0. Here, since the actual adjustment is executed on the lattice points GD0 of the adjustment target profile 550, the adjustment is affected up to a range broader than the set adjustment range A0 in some cases.

Figure 22B:
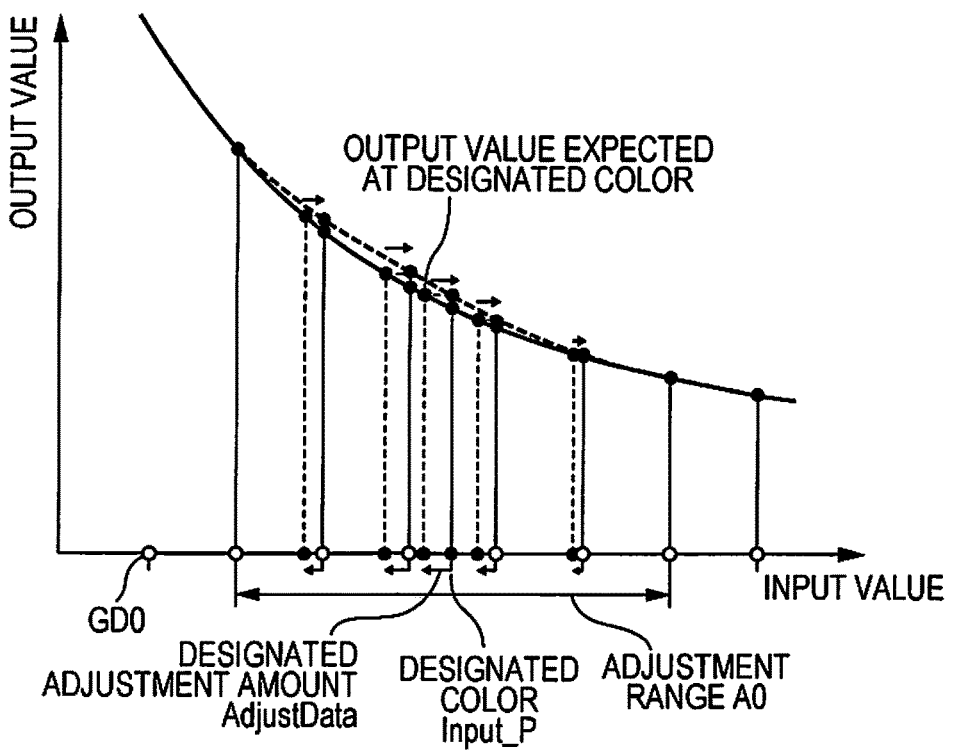

FIG. 22B schematically exemplifies the adjustment amount AD of each lattice point GD0 when the input value is adjusted. The adjustment point P0 designated by the user corresponds to the input value Input_P. When the user gives an instruction of the adjustment amount AdjustData as the adjustment target T0, the output value corresponding to the input value Input_P+AdjustData obtained by adding the adjustment amount AdjustData to the input value Input_P is an output value expected at the adjustment point P0 designated by the user. Of course, when the adjustment target color space CS6 is the CMYK color space, the input values Input_P are expressed with the CMYK values and the adjustment amount AdjustData are expressed with the relative values (ΔCp, ΔMp, ΔYp, ΔKp) of the CMYK values. When the adjustment target color space CS6 is the Lab color space, the input values Input_P are expressed with the Lab values, and the adjustment amounts AdjustData are expressed with the relative values (ΔLp, Δap, Δbp) of the Lab values.

The above-described correction is executed on all the coordinate axes of the input color space CS4 and all the coordinate values of the output color space CS5.

Next, an example in which the adjustment amounts AD is set at each lattice point GD0 of the adjustment range A0 will be described with reference to FIGS. 23A and 23B. Here, in FIGS. 23A and 23B, the horizontal axis represents input values and the vertical axis represents the adjustment amounts AD of the output values. A triangle on the horizontal axis indicates the lattice point (excluding a nearest lattice point GDnearest) in the adjustment range A0 and a rectangle on the horizontal axis indicates the lattice point at which the output values outside of the adjustment range A0 are not corrected.

Figure 23A:
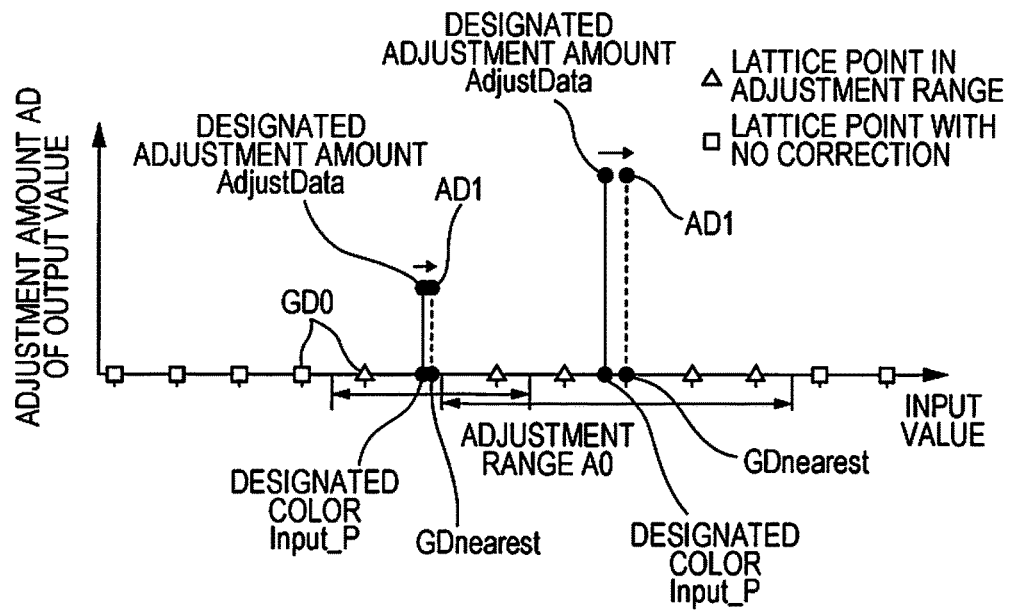
FIG. 23A is a diagram schematically illustrating an example in which an adjustment amount of an output value at a nearest lattice point is determined and FIG. 23B is a diagram schematically illustrating an example in which an adjustment amount of an output value at a lattice point in the vicinity of the nearest lattice point is determined.

As illustrated in FIG. 23A, the host device 100 determines the adjustment amounts AD1 of the output values for the nearest lattice point GDnearest which is a lattice point closest to the adjustment point P0 at each adjustment point P0 (S110 of FIG. 6). FIG. 23A illustrates an example in which the adjustment amounts AD1 of the output values are determined when there are two adjustment points P0 (the input values Input_P) on a certain coordinate axis of the input color space CS4. In the example of FIG. 23A, the adjustment amounts AdjustData for the input value Input_P are set as the adjustment amounts AD1 of the output values for the nearest lattice point GDnearest without change. Of course, the technology is no limited to the adjustment amounts AdjustData set as the adjustment amounts AD1 of the output values for the nearest lattice point GDnearest.

Figure 23B:
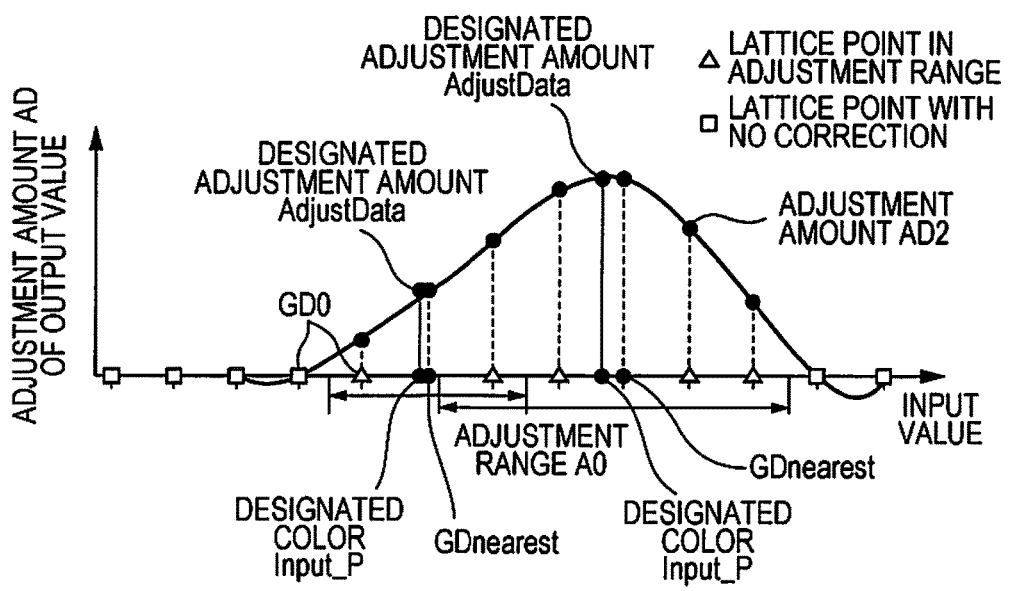

After the host device 100 determines the adjustment amounts AD1 of the output values at the nearest lattice point GDnearest, as illustrated in FIG. 23B, the host device 100 determines adjustment amounts AD2 of the output values at a lattice point (a lattice point with the triangle) around the nearest lattice point GDnearest in the adjustment range A0 with regard to each component combined with the target profile 550 (S112 of FIG. 6). For example, by setting the adjustment amounts of the output values at the lattice point outside of the adjustment range A0 to 0, setting AdjustData as the adjustment amounts AD1 of the output values at each nearest lattice point GDnearest described above, and executing interpolation calculation by a 3-dimensional or 4-dimensional cubic spline function, it is possible to determine the adjustment amounts AD2 of the output values at a surrounding lattice point. Here, when the input color space CS4 is the CMYK color space, the interpolation calculation may be executed by a 4-dimensional cubic spline function. When the input color space CS4 is the Lab color space, the interpolation calculation may be executed by a 3-dimensional cubic spline function. By executing the interpolation calculation, the adjustment amounts AD2 of the output values at the surrounding lattice point is smoothly connected between the adjustment amounts AD1 of the output values at the nearest lattice point GDnearest and the adjustment amounts of "0" at the lattice point outside of the adjustment range A0.

Of course, the technology is not limited to the spline functions used for the interpolation calculation.

In the specific example, since the plurality of components are combined with the adjustment target profile 550, the lattice points GD0 at which the adjustment amounts AD1 and AD2 are set in the case of the combination target which is the first component are the same as the lattice points GD0 at which the adjustment amounts AD1 and AD2 are set in the case of the combination target which is the second component. In this case, the adjustment amounts AD1 and AD2 of the output values for the lattice points GD0 may be distributed according to weights designated in the distribution designation fields 915 and 925 illustrated in FIGS. 10 and 11. For example, this distribution can be executed using the adjustment amount D illustrated in FIG. 14B.

For example, when the first input profile 611 and the output profile 620 are combined at a certain lattice point GD0, the adjustment amount D1=1.00 and the weight a1=50.0% are set. When the second input profile 612 and the output profile 620 are combined, the adjustment amount D2=2.00 and the weight a2=20.0% are set. When the spot color 645 and the output profile 620 are combined, adjustment amount D3=3.00 and the weight a1=50.0% are set. In this case, the adjustment amount D is calculated to $(50.0 \times 1.00 + 20.0 \times 2.00 + 30.0 \times 3.00)/(50.0 + 20.0 + 30.0) = 1.80$.

In addition, when the input profile 610 and the first output profile 621 are combined at the certain lattice point GD0, the adjustment amount D1=1.40 and the weight a1=50.0% are set. When the second input profile 612 and the output profile 620 are combined, the adjustment amount D2=2.10 and the weight a2=20.0% are set. In this case, the adjustment amount D is calculated to $(50.0 \times 1.40 + 20.0 \times 2.10)/(50.0 + 20.0) = 1.60$.

After the adjustment amounts AD of the output values at each lattice point of the adjustment range A0 is determined, the host device 100 reflects the determined adjustment amounts AD in the adjustment target profile 550 (S114 of FIG. 6). That is, values obtained by adding the adjustment amounts AD to the current output values at each lattice point of the adjustment range A0 may be written as the output values after updating in the adjustment target profile 550. For example, when the output color space CS5 of the adjustment target profile 550 is the cmyk color space, values $(cq+\Delta cq, mq+\Delta mq, yq+\Delta yq, kq+\Delta kq)$ obtained by adding the adjustment amounts $(\Delta cq, \Delta mq, \Delta yq, \Delta kq)$ to current output values $(cq, mq, yq, kq)$ are the output values after the updating. When the output color space CS5 of the adjustment target profile 550 is the Lab color space, values $(Lq+\Delta Lq, aq+\Delta aq, bq+\Delta bq)$ obtained by adding the adjustment amounts $(\Delta Lq, \Delta aq, \Delta bq)$ to current output values $(Lq, aq, bq)$ are the output values after the updating. Here, the variable q is a variable for identifying the lattice point in the adjustment range A0.

In this way, the correspondent relation of the adjustment target profile 550 is adjusted so that the current output values CurrentOut in the second color space CS2 are close to the target output values TargetOut. When there is the information appropriate for the designation intent in the adjustment target profile 550, the adjustment target profile 550 is adjusted in the correspondent relation appropriate for the designation intent.

After the adjustment target profile 550 is updated, the host device 100 obtains the current output values CurrentOut using the adjustment target profile 550 after the updating or the combination of the profiles including the adjustment target profile 550 after the updating at each adjustment point P0 input to the target acceptance region 840 (S116). The current output values CurrentOut after the updating can be calculated using the same expression as the process of S104 described with reference to FIG. 17C. When there is the information appropriate for the designation intent in the profile, the color conversion is executed according to the information appropriate for the designation intent.

The host device 100 obtains differences d between the current output values CurrentOut after the updating and the target output values TargetOut at each adjustment point P0 input to the target acceptance region 840 (S118). For example, the differences can be Euclid distances between points corresponding to the output values CurrentOut in the output color space CS5 of the adjustment target profile 550 and points corresponding to the target output values TargetOut.

In addition, the host device 100 determines whether an end condition of the repeated process of S108 to S120 is established (S120). When the end condition is not established, the process of S108 to S120 is repeated. When the end condition is established, the profile adjustment process ends. For example, when the differences d at all the adjustment points P0 are equal to or less than predetermined thresholds, the end condition can be established. When the repeated process reaches a specified number of times, the end condition may be established.

As described above, the current adjustment target profile 550 is adjusted so that the current output values CurrentOut obtained from the input coordinate values corresponding to the adjustment point P0 according to the combination including the adjustment target profiles 550 are closed to the target output values TargetOut. In this way, since the adjustment target profile 550 is adjusted using the coordinate values indicating the output colors $cmyk_p$ as the reference, the profile used to convert the coordinate values of the color space can be adjusted with good color reproduction precision in the specific example. At this time, since the adjustment target profile 550 or the adjustment target color space CS6 can be designated, the specific example can flexibly correspond to a use environment of a user.

In the specific example, in addition to the first input profile 611 for the target printer but also the second input profile 612 for the RGB data, the spot color 645 for directly designating colors with the Lab values, or the like can be combined with one output profile 620. Not only can the combination of the first input profile 611 and the output profile 620 be optimized, but a combination another component (612 or 645) and the output profile 620 can also be optimized. Therefore, it is not necessary to switch the combination target to adjust the output profile 620. Accordingly, it is possible to improve convenience of the work for adjusting the output profile when the plurality of kinds of color conversion are executed.

Further, in the specific example, in addition to the first output profile 621 for the print substrate A, the second output profile 622 for the print substrate B or the like can be combined with one input profile 610. Not only can the combination of the input profile 610 and the first output profile 621 be optimized, but a combination another component (622) and the input profile 610 can also be optimized. Therefore, it is not necessary to switch the combination target to adjust the input profile 610. Accordingly, it is possible to improve convenience of the work for adjusting the input profile when the plurality of kinds of color conversion are executed.

(6) Modification Examples

Various modification examples of the invention can be considered.

For example, an output device is not limited to an ink jet printer, but may be an electrographic printer such as a laser printer, a 3-dimensional printer, a display device, or the like.

The kinds of color materials for forming an image are not limited to C, M, Y, and K, but may include Lc, Lm, dark yellow (Dy) with higher density than Y, orange (Or), green (Gr), light black (Lk) with lower density than K, unpigmented color materials for image quality improvement, or the like in addition to C, M, Y, and K.

Of course, the second color space is not limited to the cmyk color space, but may be the CMY color space, the RGB color space, or the like.

A target device is not limited to a target printer, but may be a display device or the like.

Of course, the first color space is not limited to the CMYK color space, but may be the CMY color space, the RGB color space, or the like.

A selection target of the adjustment target color space are not limited to the three kinds of color spaces, the first color space, the second color space, and the profile connection space, but may be two kinds of color spaces, the first color space and the second color space, may be two kinds of color spaces, the first color space and the profile connection space, or may be two kinds of color spaces, the second color space and the profile connection space.

The technology includes not only the case in which the plurality of input profiles are normally combined with the output profile without being combined with the spot color but also the case in which the input profile and the spot color are normally combined with the output profile, it is possible to obtain the basic operational effects and the advantages of Aspect 1 of the technology.

Even for the input profile which is not the adjustment target profile, it is possible to obtain the basic operational effects and the advantages of Aspect 1 of the technology when a plurality of components are combined with the output profile.

Further, even for the output profile which is not the adjustment target profile, it is possible to obtain the basic operational effects and the advantages of Aspect 2 of the technology when a plurality of components are combined with the input profile.

(7) Conclusion

As described above, according to the various aspects of the invention, it is possible to provide the technology or the like for improving convenience of work for adjusting a profile when a plurality of kinds of color conversion are executed. Of course, even in a technology realized by only constituent factors according to the independent claims, it is possible to obtain the above-described basic operational effects and advantages.

It is also embody configurations in which configurations disclosed in the above-described examples are substituted or combinations thereof are changed and configurations in which configurations disclosed in the known technologies and the above-described examples are substituted or combinations thereof are changed. The invention also includes such configurations.

This application claims priority under 35 U.S.C. § 119 to Japanese Patent Application No. 2017-111412, filed Jun. 6, 2017. The entire disclosure of Japanese Patent Application No. 2017-111412 is hereby incorporated herein by reference.

What is claimed is:

1. A profile adjustment method of adjusting a profile to be used to convert first coordinate values of a first color space into second coordinate values of a second color space, the profile adjustment method comprising:

accepting a first input profile defining a correspondent relation between the first coordinate values and third coordinate values of a profile connection space, as a first component combined with an output profile defining a correspondent relation between the third coordinate values and the second coordinate values;

accepting at least one of a second input profile defining a correspondent relation between the first coordinate values and the third coordinate values, and a spot color expressed with the third coordinate values, as a second component combined with the output profile;

accepting a first target of adjustment values at coordinates indicating an adjustment target color when the first coordinate values are converted into the second coordinate values according to the first component and the output profile;

accepting a second target of adjustment values at coordinates indicating an adjustment target color when at least one of the first coordinate values and the third coordinate values is converted into the second coordinate values according to the second component and the output profile; and adjusting the output profile based on the accepted first and second targets.

2. A profile adjustment method of adjusting a profile to be used to convert first coordinate values of a first color space into second coordinate values of a second color space, the profile adjustment method comprising:

accepting a first output profile defining a correspondent relation between third coordinate values of a profile connection space and the second coordinate values, as a first component combined with an input profile defining a correspondent relation between the first coordinate values and the third coordinate values;

accepting a second output profile defining a correspondent relation between the third coordinate values and the second coordinate values, as a second component combining with the input profile;

accepting a first target of adjustment values at coordinates indicating an adjustment target color when the first coordinate values are converted into the second coordinate values according to the input profile and the first component;

accepting a second target of adjustment values at coordinates indicating an adjustment target color when the first coordinate values are converted into the second coordinate values according to the input profile and the second component; and adjusting the input profile based on the accepted first and second targets.

3. The profile adjustment method according to claim 1, wherein in the accepting of the first target, one of two or more kinds of color spaces among the first color space, the second color space, and the profile connection space is accepted as a first adjustment target color space and the first target of the adjustment values at the coordinates indicating the adjustment target color in the first adjustment target color space is accepted.

4. The profile adjustment method according to claim 2, wherein in the accepting of the first target, one of two or more kinds of color spaces among the first color space, the second color space, and the profile connection space is accepted as a first adjustment target color space and the first target of the adjustment values at the coordinates indicating the adjustment target color in the first adjustment target color space is accepted.

5. The profile adjustment method according to claim 1, wherein in the accepting of the second target, one of two or more kinds of color spaces among the first color space, the second color space, and the profile connection space is accepted as a second adjustment target color space and the second target of the adjustment values at the coordinates indicating the adjustment target color in the second adjustment target color space is accepted.

6. The profile adjustment method according to claim 2, wherein in the accepting of the second target, one of two or more kinds of color spaces among the first color space, the second color space, and the profile connection space is accepted as a second adjustment target color space and the second target of the adjustment values at the coordinates indicating the adjustment target color in the second adjustment target color space is accepted.

7. The profile adjustment method according to claim 1, further comprising:

accepting an adjustment range adjusted based on the first and second targets in an adjustment target profile which is an adjustment target in the adjusting of the output profile, wherein in the adjusting of the output profile, the adjustment range of the adjustment target profile is adjusted based on the first target and the second target.

8. The profile adjustment method according to claim 2, further comprising:

accepting an adjustment range adjusted based on the first and second targets in an adjustment target profile which is an adjustment target in the adjusting of the input profile, wherein in the adjusting of the input profile, the adjustment range of the adjustment target profile is adjusted based on the first target and the second target.

9. The profile adjustment method according to claim 1, wherein in the adjusting of the output profile, when a range adjusted by the first target overlaps a range adjusted by the second target in an adjustment target profile which is an adjustment target, the adjustment target profile is adjusted so that an adjustment amount is obtained using a first adjustment amount indicating degree of adjustment by the first target and a second adjustment amount indicating degree of adjustment by the second target in the overlapping range.

10. The profile adjustment method according to claim 2, wherein in the adjusting of the input profile, when a range adjusted by the first target overlaps a range adjusted by the second target in an adjustment target profile which is an adjustment target, the adjustment target profile is adjusted so that an adjustment amount is obtained using a first adjustment amount indicating degree of adjustment by the first target and a second adjustment amount indicating degree of adjustment by the second target in the overlapping range.

11. The profile adjustment method according to claim 9, further comprising:

accepting setting of a coefficient in at least one of the first and second adjustment amounts for obtaining an adjustment amount in the overlapping range, wherein in the adjusting of the output profile, the adjustment target profile is adjusted so that an adjustment amount is obtained using the first and second adjustment amounts according to the coefficient in the overlapping range.

12. The profile adjustment method according to claim 10, further comprising:

accepting setting of a coefficient in at least one of the first and second adjustment amounts for obtaining an adjustment amount in the overlapping range, wherein in the adjusting of the input profile, the adjustment target profile is adjusted so that an adjustment amount is obtained using the first and second adjustment amounts according to the coefficient in the overlapping range.

13. The profile adjustment method according to claim 1, wherein in the adjusting of the output profile, when the first and second targets are not expressed with the second coordinate values, the second coordinate values corresponding to the first and second targets are obtained as target output values and the adjustment target profile is adjusted so that the second coordinate values obtained according to the first or second component and an adjustment target profile which is an adjustment target are close to the target output values from coordinates indicating the adjustment target color.

14. The profile adjustment method according to claim 2, wherein in the adjusting of the input profile, when the first and second targets are not expressed with the second coordinate values, the second coordinate values corresponding to the first and second targets are obtained as target output values and the adjustment target profile is adjusted so that the second coordinate values obtained according to the first or second component and an adjustment target profile which is an adjustment target are close to the target output values from coordinates indicating the adjustment target color.

\* \* \* \* \*